(12) United States Patent
Yano et al.

(10) Patent No.: US 7,194,505 B2
(45) Date of Patent: Mar. 20, 2007

(54) SHARED INFORMATION PROCESSING SYSTEM AND RECORDING MEDIUM

(75) Inventors: Ai Yano, Kawasaki (JP); Ryuichi Matsukura, Kawasaki (JP); Kazuo Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 757 days.

(21) Appl. No.: 09/938,550

(22) Filed: Aug. 27, 2001

(65) Prior Publication Data
US 2002/0169826 A1  Nov. 14, 2002

(30) Foreign Application Priority Data
Jan. 12, 2001 (JP) .............................. 2001-004301

(51) Int. Cl.
*G06F 15/16* (2006.01)
(52) U.S. Cl. ...................................... 709/203; 204/217
(58) Field of Classification Search ........ 709/203–207, 709/216–219
See application file for complete search history.

(56) References Cited

U.S. PATENT DOCUMENTS

| | | | | |
|---|---|---|---|---|
| 6,065,047 A | * | 5/2000 | Carpenter et al. .......... | 709/218 |
| 6,144,991 A | * | 11/2000 | England ..................... | 709/205 |
| 2001/0013054 A1 | * | 8/2001 | Okawa et al. .............. | 709/204 |
| 2002/0023132 A1 | * | 2/2002 | Tornabene et al. .......... | 709/205 |
| 2002/0059379 A1 | * | 5/2002 | Harvey et al. .............. | 709/205 |
| 2003/0014489 A1 | * | 1/2003 | Inala et al. ................. | 709/204 |

* cited by examiner

*Primary Examiner*—Krisna Lim
*Assistant Examiner*—Yasin Barqadle
(74) *Attorney, Agent, or Firm*—Staas & Halsey LLP

(57) ABSTRACT

The present invention provides a shared information processing system, such that information can be shared between a plurality of clients and a server with a chat system is constructed, and it is possible to acquire from a server or other clients information about files frequently used by a user registered at a client, or update information thereof, and to display this information. A client terminal 200 includes a link file registration component 211 that notifies a server terminal 100 of registration information for link files, a link file manager 212 that acquires and manages information pertaining to link files, and a link file status display component 213 that displays information pertaining to link files; and a server terminal 100 includes a link file information notification component 102 that acquires information pertaining to link files and sends this information to the client terminal 200.

14 Claims, 33 Drawing Sheets

SHARED INFORMATION PROCESSING SYSTEM AND RECORDING MEDIUM

BACKGROUND OF THE INVENTION

1. Technical Field

The present invention relates to a shared information processing system wherein a plurality of users can communicate simultaneously by sharing one of virtual chat rooms, called a channel, set up on a network by a server and clients interconnected over the network, and notifying other clients of a chat character string inputted by a user through a client.

2. Description of Related Art

With a chat system consisting of a chat server and a plurality of chat clients interconnected over a network, a virtual chat room called a channel that is set up on the network is shared by a plurality of chat clients, thus configuring a chat system that allows text messages to be sent and received in real time.

A user participates in one of channels by operating a client terminal where a chat client application is installed. Here, a user is uniquely designated within a channel by an identifier called a nickname. To send a message into the channel, a user inputs text from a client terminal, and this text is sent along with the nickname to the chat server. The chat server broadcasts the text message sent from one chat client to all the other chat clients participating on the same channel.

The explosive growth of the Internet has led to collaborative work projects becoming frequent, where users work together connected through information terminals, and the chat system described above is sometimes used for such collaborative work projects. For instance, if a plurality of users engage in a chat session within a channel using client terminals with chat clients installed, they can conduct a real-time electronic meeting in which this channel serves as an electronic meeting room.

Aside from this, in the viewing of documents and the like found on a shared server or a web page accessible through a network, the addresses of web pages and so forth that are frequently visited by a user are registered in a web browser by utilizing a function called "favorites" or "bookmark," so that these sites can be viewed again with ease merely by selecting the desired address from a list of registered addresses. Thus, when a "favorite" or "bookmark" is registered in the web browser, frequently viewed web pages, documents, and so forth can be accessed more easily, but to find out whether the contents of a web page or document have been updated, such a web page or the like must be accessed through the web browser and actually opened and checked, or an update notification must be received by electronic mail (e-mail), or the addresses of highlighted files are registered to and supervised by a dedicated client for monitoring update information.

Even if update information about a web page registered as a "favorite" or "bookmark" of the web browser is acquired by e-mail or a dedicated client, the information only reveals that there has been an update, so to find out what the update actually consists of, a user must open that web page with the web browser and check its contents.

And while notification will be made if there has been an update on a document on a shared server, a user must actually open that document to check its contents.

Furthermore, with a web page, this information is personally managed by the administrator of that web page, and cannot be managed or viewed in common by a plurality of peers on the network.

With the chat system such as the one described above, the sending and receiving of a given text message through a channel on a network is performed by a plurality of client terminals where a chat client application is installed; enabling information pertaining to files frequently used by a user and registered at each client terminal to be sent and received in this same way, would facilitate the sharing of information with other clients or the server.

SUMMARY OF THE INVENTION

It is an object of the present invention to provide a shared information processing system whereby information can be shared among a plurality of clients and a server with a chat system, and information about files frequently used by a user registered at a client, or update information thereof, can be acquired from a server or other clients and displayed.

The present invention provides a shared information processing system wherein a plurality of users can communicate simultaneously by the sharing of one of virtual chat rooms (hereinafter "channel") set up on a network by a server and clients interconnected over the network, and the notifying of other clients of a chat character string inputted by a user through the client. The client comprises highlighted file registration means for accepting from a user a request for registration of a highlighted file and performing registration on a highlighted file list, and also notifying the server of registration information for the highlighted file; highlighted file management means for acquiring information pertaining to the highlighted file through the server and managing the same; and highlighted file status display means for displaying information pertaining to the highlighted file, and the server comprises highlighted file table management means for managing highlighted file names registered to each client using registration information about which notification has been given by the highlighted file registration means of the client; and highlighted file information notification means for acquiring information pertaining to a highlighted file managed by the highlighted file table management means, and giving notification thereof to the client where the highlighted file is registered.

Here, the shared information processing system can be configured so that the highlighted file information notification means acquires basic information such as where a highlighted file is stored, and notifies the client thereof.

The highlighted file information notification means can be also configured to acquire update information such as when and by whom a highlighted file was updated, and notify the client thereof.

The server further can comprise user information management means for acquiring user information about a user that has registered a highlighted file at the client, and notifies the administrator of the highlighted file of statistical information based on the user information.

The present invention provides a shared information processing system wherein a plurality of users can communicate simultaneously by the sharing of one of virtual chat rooms (hereinafter "channel") set up on a network by a server and clients interconnected over the network, and the notifying of other clients of a chat character string inputted by a user through the client. The server comprises highlighted file table management means for managing the correspondence between a channel and a highlighted file related to that channel; and update information notification means for acquiring update information for the channel and updating information pertaining to the corresponding highlighted file, acquiring update information for the highlighted file and updating information pertaining to the corresponding channel, and notifying each client of the update information; and the client comprises highlighted file management means for acquiring information pertaining to a highlighted file related to the channel through the server and managing the same; and highlighted file status display means for displaying information pertaining to the highlighted file.

Here, the server further comprises accessory part management means for managing the correspondence between accessory parts of a highlighted file related to a channel and accessory parts within each channel; and accessory part update information management means for acquiring update information for accessory parts within each channel and updating information pertaining to accessory parts of the corresponding highlighted file, and acquiring update information for accessory parts within the highlighted file and updating information pertaining to accessory parts within the corresponding channel, and notifying each client of the update information.

Also, the present invention provides a shared information processing system wherein a plurality of users can communicate simultaneously by the sharing of one of virtual chat rooms (hereinafter "channel") set up on a network by a server and clients interconnected over the network, and the notifying of other clients of a chat character string inputted by a user through the client. The client comprises highlighted file name extraction means for extracting file names that can be registered as highlighted files from a chat character string inputted by a user within each channel; highlighted file registration determination means for determining whether or not a file corresponding to an extracted file name is to be registered as a highlighted file; highlighted file registration means for registering a highlighted file as related to the corresponding channel when the highlighted file registration determination means determines that a highlighted file is to be registered, and notifying the server of registration information for the highlighted file; highlighted file management means for acquiring information pertaining to the highlighted file through the server and managing the same; and highlighted file status display means for displaying information pertaining to the highlighted file, and the server comprises highlighted file table management means for managing highlighted file names registered to the client using the registration information about which notification has been given by the highlighted file registration means of the client; and highlighted file information notification means for acquiring information pertaining to a highlighted file managed by the highlighted file table management means, and giving notification thereof to the channel or the client where the highlighted file is registered.

The present invention further provides a shared information processing system wherein a plurality of users can communicate simultaneously by the sharing of one of virtual chat rooms (hereinafter "channel") set up on a network by a server and clients interconnected over the network, and the notifying of other clients of a chat character string inputted by a user through the client. The client comprises highlighted file information management means for managing information pertaining to a highlighted file related to the channel; highlighted file action notification means for notifying the server of action information pertaining to an action performed on the highlighted file by a user; and highlighted file action user display means for receiving from the server action information about a highlighted file registered as related with each channel, and displaying a list of action information; and the server comprises highlighted file action user notification means for notifying the other clients or channels of an action on a highlighted file about which notification has been given by the client.

The present invention further provides a shared information processing system wherein a plurality of users can communicate simultaneously by the sharing of one of virtual chat rooms (hereinafter "channel") set up on a network by a server and clients interconnected over the network, and the notifying of other clients of a chat character string inputted by a user through the client. The client comprises highlighted file registration means for receiving from a user a request for registration of a highlighted file and registering the highlighted file, and also notifying the other clients of the registration information for the highlighted file through the network; highlighted file management means for acquiring through the network information pertaining to the highlighted file using registration information about which notification has been given by the highlighted file registration means of the other clients and managing the same; and highlighted file status display means for displaying information pertaining to the highlighted file.

Also, the present invention provides a shared information processing system wherein a plurality of users can communicate simultaneously by the sharing of one of virtual chat rooms (hereinafter "channel") set up on a network by a server and clients interconnected over the network, and the notifying of other clients of a chat character string inputted by a user through the client. The client comprises highlighted file information management means for managing information pertaining to a highlighted file related to each channel; highlighted file action notification means for notifying the other clients of action information pertaining to an action performed on the highlighted file by a user; and highlighted file action user display means for receiving action information about a highlighted file about which notification has been given by another client, and displaying a list of action information about registered highlighted files.

The present invention provides a recording medium that stores a program for a shared information processing system wherein a plurality of users can communicate simultaneously by the sharing of one of virtual chat rooms (hereinafter "channel") set up on a network by a server and clients interconnected over the network, and the notifying of other clients of a chat character string inputted by a user through the client. The recording medium storing a program for a client system comprises highlighted file registration means for receiving from a user a request for the registration of a highlighted file and performing registration on a highlighted file list, and also notifying the server of registration information for the highlighted file; highlighted file management means for acquiring information pertaining to the highlighted file through the server and managing the same; and highlighted file status display means for displaying information pertaining to the highlighted file.

Also, the present invention provides a recording medium that stores a program for a shared information processing system wherein a plurality of users can communicate simultaneously by the sharing of one of virtual chat rooms (hereinafter "channel") set up on a network by a server and clients interconnected over the network, and the notifying of other clients of a chat character string inputted by a user through one the client. The recording medium storing a program for a server system comprises highlighted file table management means for managing highlighted file names registered by each client using the registration information about which notification has been given by the client; and highlighted file information notification means for acquiring information pertaining to a highlighted file managed by the highlighted file table management means, and giving notification thereof to the client where the highlighted file is registered.

The present invention further provides a program for effecting the function of a server used in a shared information processing system wherein a plurality of users can communicate simultaneously by the sharing of one of virtual chat rooms (hereinafter "channel") set up on a network by a server and clients interconnected over the network, and the notifying of other clients of a chat character string inputted by a user through the client. The program effects the functions of:

highlighted file table management means for managing highlighted file names for the each channel using the registration information about which notification has been given by the highlighted file registration means of the client; and highlighted file information notification means for acquiring information pertaining to a highlighted file managed by the highlighted file table management means, and giving notification thereof to the client where the highlighted file is registered.

Also, the present invention provides a program for effecting the function of a client used in a shared information processing system wherein a plurality of users can communicate simultaneously by the sharing of one of virtual chat rooms (hereinafter "channel") set up on a network by a server and clients interconnected over the network, and the notifying of other clients of a chat character string inputted by a user through the client. The program effects the functions of:

highlighted file registration means for receiving from a user a request for the registration of a highlighted file and performing the registration on a highlighted file list, and also notifying the server of registration information for the highlighted file;

highlighted file management means for acquiring information pertaining to the highlighted file through the server and managing the same; and highlighted file status display means for displaying information pertaining to the highlighted file.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

In the following embodiments, the "highlighted files" discussed in the Claims will be referred to as "link files."

First Embodiment

Figure 1:
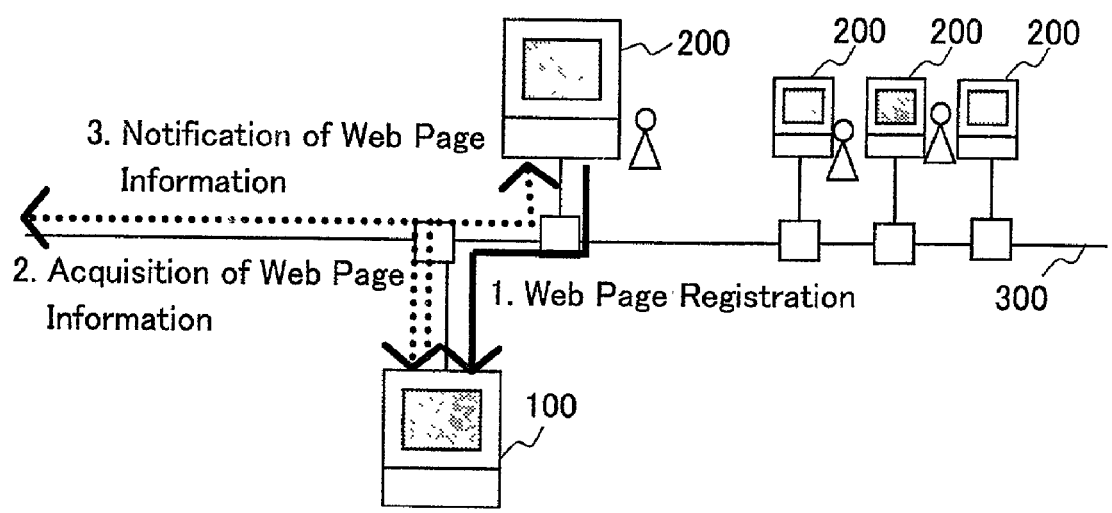
FIG. 1 is a schematic representation of the configuration of the first embodiment.

FIG. 1 is a schematic view of a system in which the first embodiment of the present invention is employed.

Here, a server terminal 100 and a plurality of client terminals 200 are connected to a network 300, and users are able to chat with each other by sharing one of a plurality of channels set up on the network 300.

Chatting is possible between the plurality of client terminals 200 through the server terminal 100, and when link file registration is performed for a file frequently used by a user at a client terminal 200, information about this link file is acquired by the server terminal 100, and information pertaining to the link file is sent to the client terminal 200 that registered that file.

Figure 2:
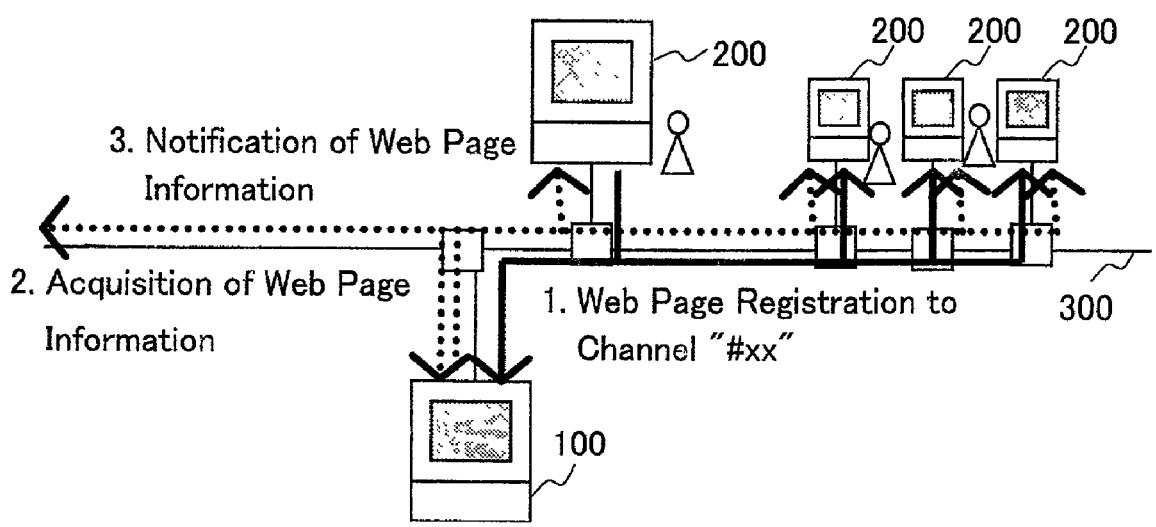
FIG. 2 is a schematic representation of the configuration of a variation on the first embodiment.

FIG. 2 shows another aspect of this first embodiment.

In this case, a user is permitted to personally perform link file registration to a client terminal 200, and link file registration related with a channel in which a user is participating is permitted. Information about a link file registered as related with the channel in this case is also sent to other client terminals 200 through the server terminal 100.

Figure 10:
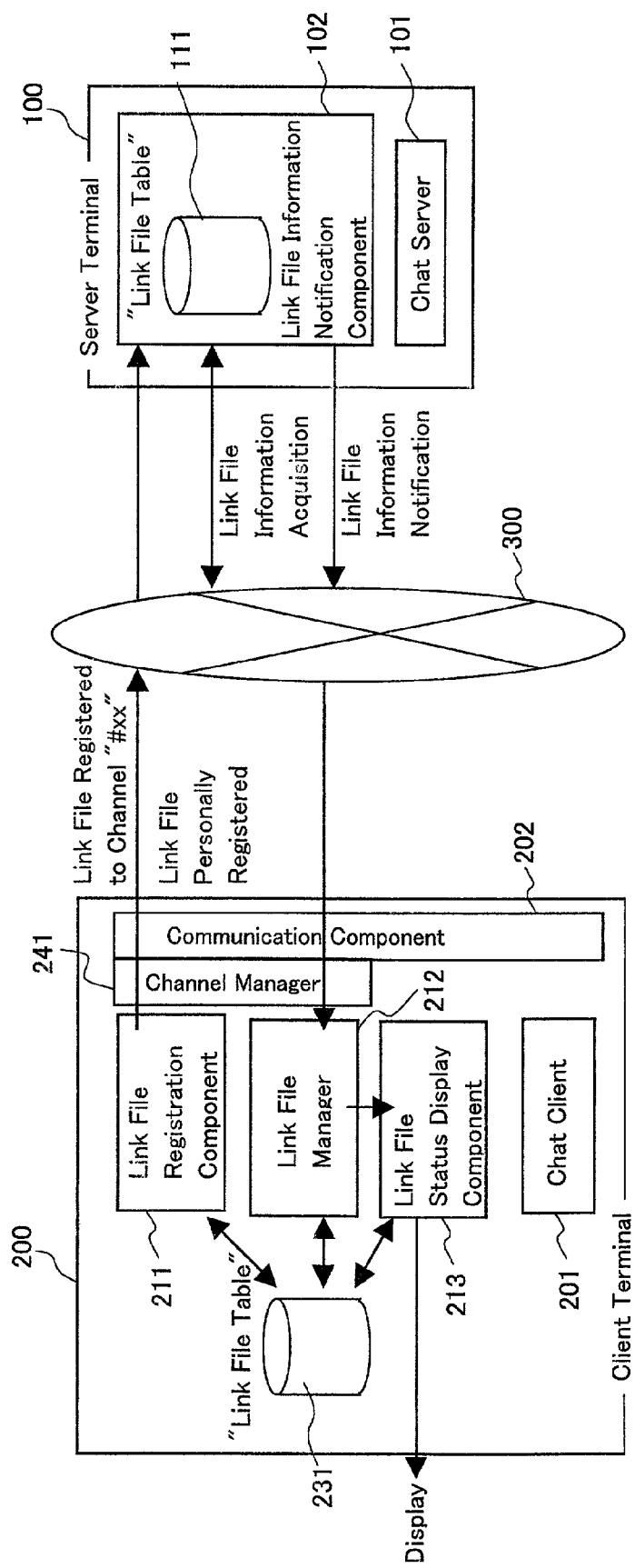
FIG. 10 is a control block diagram of the first embodiment.

FIG. 10 is a control block diagram of this first embodiment.

In a shared information processing system, a server terminal 100 and a plurality of client terminals 200 are connected to a network 300.

Each client terminal 200 comprises a chat client 201 that sends and receives text messages to and from other client terminals 200 through the network 300, a communication component 202 that sends and receives data to and from the network 300, and a channel manager 241 that manages a channel used by a user at the chat client 201. The chat client 201 receives character string input from a user and sends it through the communication component 202 as a text message within the channel, and receives text messages from the chat clients 201 of other client terminals 200. The chat content of the channel in which the user is currently participating is selected by the channel manager 241 and displayed on the client terminal 200.

The client terminal 200 also comprises a link file registration component 211 that receives from a user a request for the registration of a link file and performs link file registration, and sends the registration information for this link file to the server terminal 100 through the network 300, a link file manager 212 that acquires through the server terminal 100 information pertaining to the link files registered in the link file registration component 211 and manages the same, and a link file status display component 213 that displays the information pertaining to the registered link files.

There are two ways a request for a link file registration can be made: when a user personally registers a link file to a client terminal 200, and when a user registers a link file as related with a channel. In either case, the registration request is received by the link file registration component 211, and this link file name is stored in a link file table 231 and sent to the server terminal 100. In cases where a user personally registers a link file to a client terminal 200, the link file registration component 211 may be given a function for linking to a web browser, so that when the user makes a registration at the "favorites" or "bookmark" of the web browser, the link file registration component 211 is notified of the registered files.

The link file table 231 in the client terminal 200 is configured as shown in Table 1, for example.

TABLE 1

| Channel Name | Link File Name | Information |
|---|---|---|
| #aa | http://xxx.y.z./abc.html | E-Mamil:abc@xxx.y.z. |
| | | Tel:xxx-xx-xxxx |
| | | Fax:xxx-xx-xxxx |
| | | Date:2000/08/31 10:10:10 |
| | | ... |
| #xx | ¥¥aa¥bcd¥doc¥report.doc | E-Mail:aa@xxx.y.z |
| | | Tel:xxx-xx-xxxx |
| | | Fax:xxx-xx-xxxx |
| | | Date:2000/06/15 12:12:12 |
| | | ... |
| My Favorites | http://xxx.y.z/home/abc.html | E-Mail:abc@xxx.y.z |
| | | Tel:xxx-xx-xxxx |
| | | Fax:xxx-xx-xxxx |

TABLE 1-continued

| Channel Name | Link File Name | Information |
|---|---|---|
| | | Date:2000/01/01 01:01:01 |
| | | ... |
| My Favorites | ¥¥aa¥bcd¥doc¥report.doc | E-Mail:aa@xxx.y.z |
| | | Tel:xxx-xx-xxxx |
| | | Fax:xxx-xx-xxxx |
| | | Date:2000/06/15 12:12:12 |
| | | ... |
| ... | ... | ... |

The link file table 231 consists of the categories of channel names, link file names, and information. When a link file is to be registered to a channel being used by the user with the chat client 201 of the client terminal 200, this channel name is stored in the channel name column. When a document on a shared server or a web page is to be registered as a personal link file, "My Favorites" is selected as a channel name.

Here, when a user operating the client terminal 200 registers the web page "http//xxx.y.z/home/abc.html" as a personal link file, "My Favorites" is stored in the channel name column and "http//xxx.y.z/home/abc.html" in the link file name column, as shown by the third data from the top in Table 1.

The link file manager 212 receives from the server terminal 100 information pertaining to a link file for which a registration request has been received by the link file registration component 211, and this is related to a link file name and stored in the link file table 231. As this information pertaining to the link file, for example, basic information such as the storage location, the e-mail address of the administrator, the telephone number of the administrator, or the fax number of the administrator, and update information, such as the last update time, update contents, and updating person are stored in the information column (see Table 1).

The link file status display component 213 acquires from the link file table 231 the registered link file name, as well as basic information and update information for that link file, and displays the same.

The server terminal 100 includes a chat server 101 that broadcasts to chat clients chat contents carried on within the various channels on the network 300, a link file table 111 that manages the link file names registered to each client using link file registration information about which notification has been given by the various client terminals 200, and a link file information notification component 102 that acquires information pertaining to the link files and notifies the clients that have registered these link files.

The chat server 101 receives the chat contents carried on within the various channels and broadcasts them to the chat clients 201 of the various client terminals 200.

The link file information notification component 102 receives link file registration information about which notification has been given by the various client terminals 200 and stores the names of the link files in the link file table 111. The link file information notification component 102 accesses the URLS of the link files about which notification has been given by the various client terminals 200 and acquires information pertaining to these link files. For example, if the registered link file is a web page at "http//xxx.y.z/home/abc.html," that URL is accessed, the e-mail address of the administrator, the telephone number of the administrator, the fax number of the administrator, or other such basic information, and the last update time, update contents, updating person, and other such update information are acquired, and this information is sent to the various client terminals 200 for which link file registration has been performed.

The link file table 111 can be configured as shown in Table 2.

TABLE 2

| Channel Name | Link File Name | Information |
|---|---|---|
| #aa | http://xxx.y.z./abc.html | E-Mamil:abc@xxx.y.z.<br>Tel:xxx-xx-xxxx<br>Fax:xxx-xx-xxxx<br>Date:2000/08/31 10:10:10<br>. . . |
| #xx | ¥¥aa¥bcd¥doc¥report.doc | E-Mail:aa@xxx.y.z<br>Tel:xxx-xx-xxxx<br>Fax:xxx-xx-xxxx<br>Date:2000/06/15 12:12:12<br>. . . |
| #abc | http://xxx.y.z/abc.html | E-Mail:abc@xxx.y.z<br>Tel:xxx-xx-xxxx<br>Fax:xxx-xx-xxxx<br>Date:2000/08/31 10:10:10<br>. . . |
| Tanaka | http://xxx.y.z/home/abc.html | E-Mail:abc@xxx.y.z<br>Tel:xxx-xx-xxxx<br>Fax:xxx-xx-xxxx<br>Date:2000/01/01 01:01:01<br>. . . |
| Suzuki | ¥¥aa¥bcd¥doc¥report.doc | E-Mail:aa@xxx.y.z<br>Tel:xxx-xx-xxxx<br>Fax:xxx-xx-xxxx<br>Date:2000/06/15 12:12:12<br>. . . |
| . . . | . . . | . . . |

The link file table 111 can consist of the categories of channel names, link file names, and information, just as with the link file table 231 on the client terminal 200. Channel names that have undergone link file registration at the client terminal 200 are stored in the channel name column. When a document on a shared server or a web page is to be registered as a personal link file, the user name of that client terminal 200 is stored in the channel name column.

For example, if the web page "http//xxx.y.z/home/abc.html" is registered as a personal link file in a client terminal 200 where the registered user name is Tanaka, then the user name "Tanaka" is stored in the channel name column and "http//xxx.y.z/home/abc.html" in the link file name column, as shown by the fourth data from the top in Table 2.

It is also possible for information pertaining to a link file acquired by the link file information notification component 102 to be sent to the client terminal 200 as well as to be stored in the link file table 111 information category. In this case, the e-mail address of the administrator, the telephone number of the administrator, the fax number of the administrator, or other such basic information, and the last update time, update contents, updating person, and other such update information acquired from the web page at "http//xxx.y.z/home/abc.html" are stored in the information column for the channel name "Tanaka."

Operations of the First Embodiment

Figure 18:
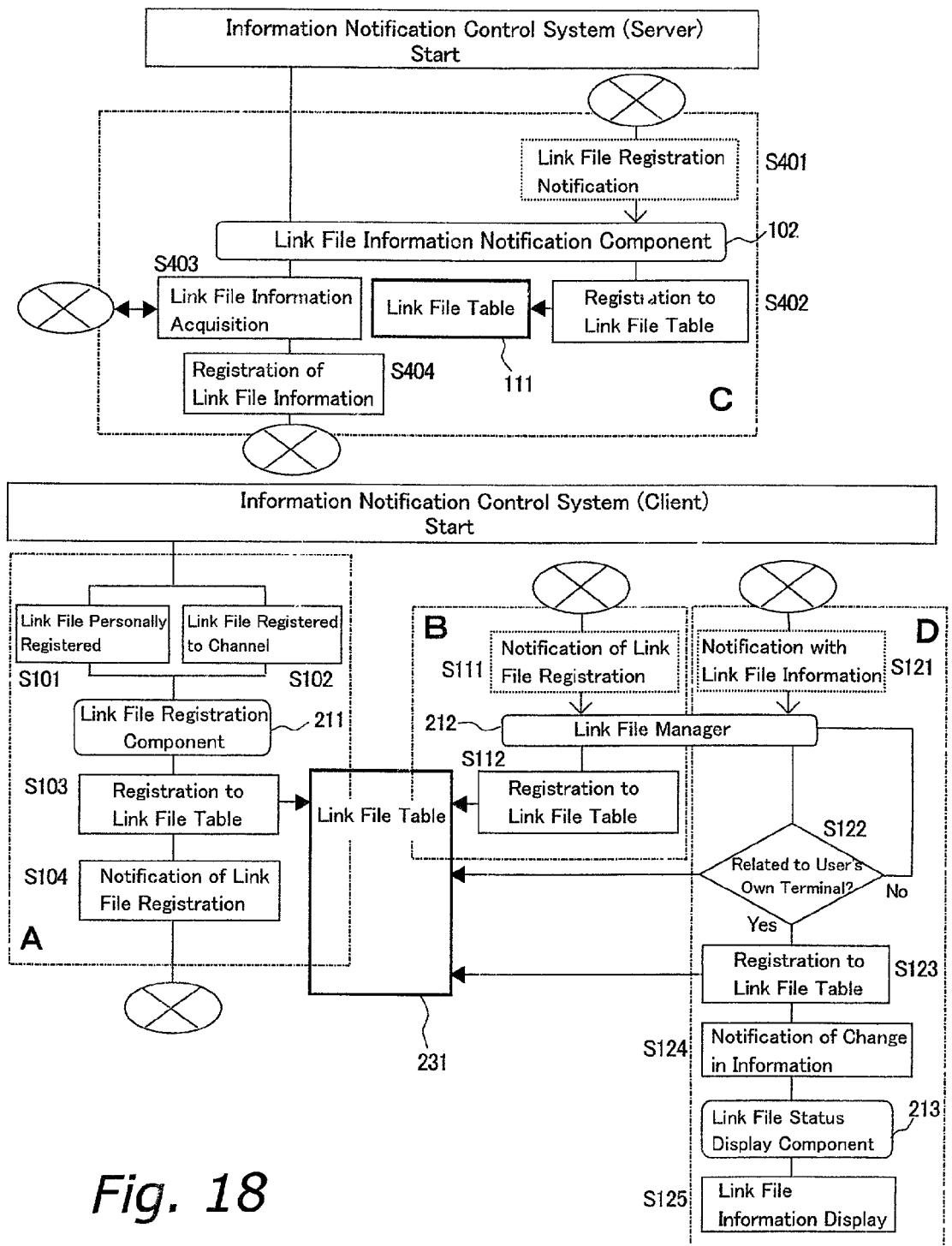
FIG. 18 is a control flow chart of the first embodiment.

FIG. 18 is a flow chart of the operation in this first embodiment.

The operations on the client terminal 200 side are labeled as processing A, B, and D, and the operation on the server terminal 100 side is labeled as processing C.

(A) Processing A is executed when there is a request for registration to a link file from a client terminal 200.

At the client terminal 200, when there is a registration request where a user personally registers a link file (step S101), or if there is a registration request where a link file is registered as related with a channel (step S102), the file name is registered to the link file table 231 by the link file registration component 211 (step S103). When a link file is registered to the link file table 231, link file registration information including that file name and the registered user name or registered channel name is sent and notified from the link file registration component 211 to the server terminal 100 (step S104).

(B) Processing B is executed when a client terminal 200 receives notification of the registration of a link file from the server terminal 100.

When there is notification of the registration of a link file at a client terminal 200 (step S111), the link file manager 212 receives this registration notification and registers the file name to the link file table 231 (step S112).

For example, when a link file is registered at another client terminal 200, the registration notification is received through the server terminal 100. A link file registration notification such as this may relate to the registration of a link file with respect to a channel. Therefore, the channel name and the link file name would be corresponded and registered to the link file table 231.

(C) Processing C is executed when the server terminal 100 receives a link file registration notification from a client terminal 200.

When the server terminal 100 receives notification of the registration of a link file from a client terminal 200 (step S401), the link file information notification component 102 registers the correspondence between the file name and the user name or channel name to the link file table 111 (step S402). At the same time, the link file information notification component 102 accesses the link file URL through the network and acquires the e-mail address of the administrator, the telephone number of the administrator, the fax number of the administrator, the last update time, or other such basic information for that link file (step S403). Furthermore, the link file information notification component 102 sends and notifies the acquired information pertaining to the link file to the client terminal 200 (step S404).

A configuration is possible such that at this point acquired information pertaining to the link file is stored in the link file table 111.

If a link file registration notification from a client terminal 200 concerns registration of a link file related to a channel, another possible configuration is for link file registration notification to be performed for other client terminals 200 simultaneously with registration to the link file table 111.

(D) Processing D is executed when the client terminal 200 receives link file information from the server terminal 100.

If the client terminal 200 receives link file information notification sent from the server terminal 100 (step S121), then the link file manager 212 determines whether this information is related to its own terminal (step S122). If the link file information notification sent from the server terminal 100 corresponds to a file name registered in the link file table 231, the information is determined to relate to that terminal, and the information pertaining to the link file about which notification was made is registered to the link file table 231 (step S123).

An information update notification to the effect that the contents of the link file table 231 have been updated is produced in response to the link file information notification, and this is notified to the link file status display component 213 and displayed(step S124). The link file status display component 213 displays information pertaining to the link file on a display device of the client terminal 200 (step S125).

Screen Configuration

Figure 26:
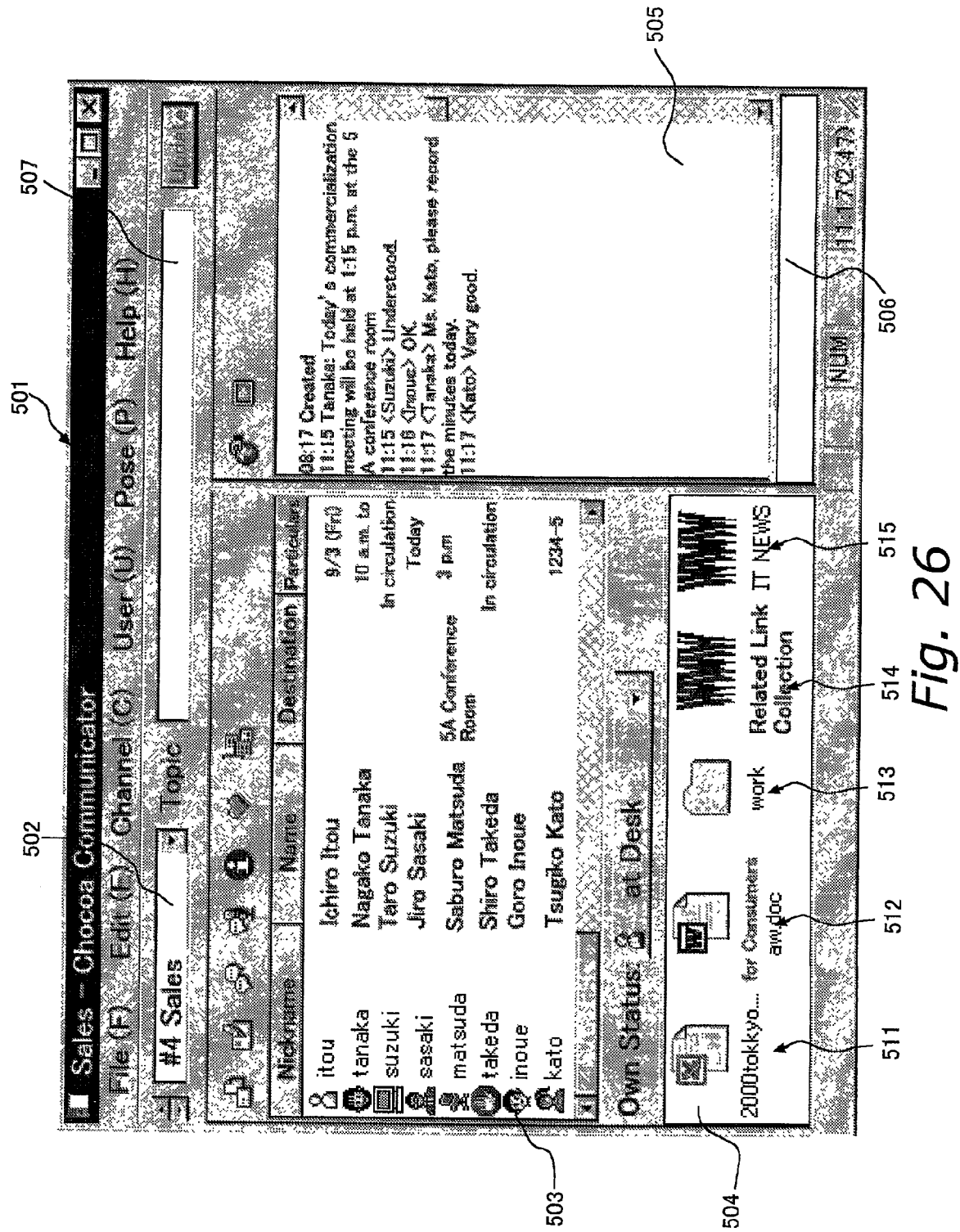
FIG. 26 is a diagram illustrating the basic screen of a chat client.
Figure 27:
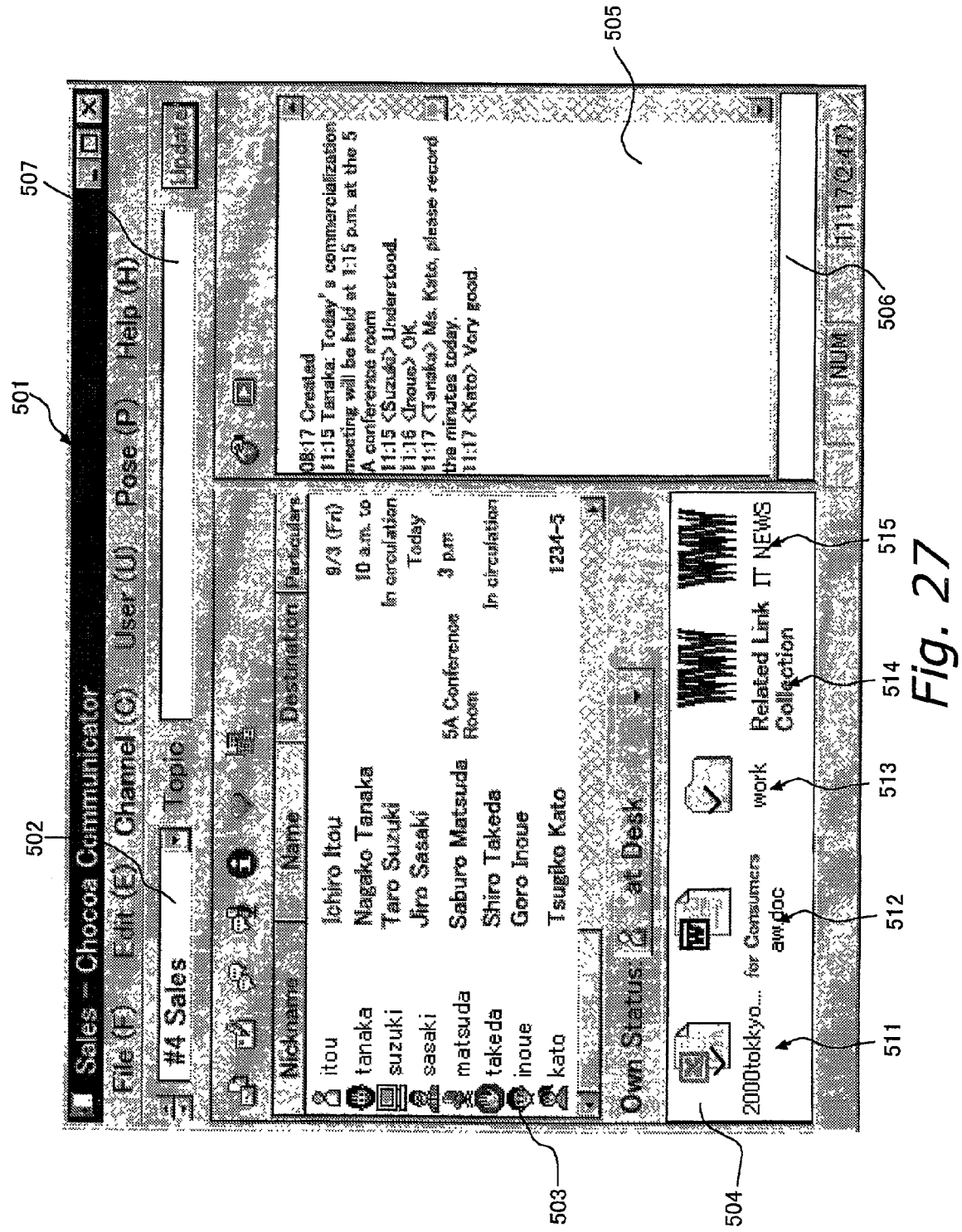
FIG. 27 is a diagram related to the screen display of an information update notification.

FIGS. 26 and 27 illustrate examples of screen configuration on the client terminal 200 in this embodiment.

As shown in FIG. 26, a basic screen 501 of the chat client 201 includes a channel selector 502, a topic display component 507, a channel participant display component 503, a chat log display component 505, a chat input component 506, a user status button 508, and so forth.

The channel selector 502 includes a pull-down button, a selection scroll button, or the like, and when a user is participating in a plurality of channels, this allows the selection of the one to be displayed. The topic display component 507 displays the topic assigned to the channel currently selected by the channel selector 502, and displays what is being discussed and so forth on the current channel set up by the channel participants.

The channel participant display component 503 displays the participants of the channel currently selected by the channel selector 502, and includes display columns for user nicknames, real names, destinations, status details, and so on.

The current status of the user operating this client terminal 200 can be set with the user status button 508, allowing for settings indicating that the user is at the terminal or, if away from the terminal, where the user went and so forth.

The contents of the chat carried on in the channel selected by the channel selector 502 are displayed in the chat log display component 505. Time of input, nickname of inputting user, message contents, and so forth are displayed in time series in this chat log display component 505.

The user of this client terminal 200 is able to send a message into the currently displayed channel by inputting a character string to a chat input component 506 and hitting the Enter key. The character string inputted with the chat input component 506 here is displayed as a user's own message on the chat log display component 505.

This basic screen 501 is further provided with a link file display component 504. Link files registered personally by the user using this client terminal 200, and link files registered as related with the channel by the channel selector 502, are displayed in this link file display component 504 as link file icons 511, 512, 513, 514, and 515. For instance, the link file icon 511 corresponds to a document file created in Microsoft Excel, the link file icon 512 to a document file created in Microsoft Word, and the link file icon 513 to a folder storing various documents. All of these are linked to files or folders stored in one of shared servers on a network. The link file icons 514 and 515 are linked to web pages posted on a network such as the Internet or on an intranet. When a mouse pointer is positioned over these link file icons 511 to 515, a user can view the link file table 231 and acquire and display basic information about the link files such as the e-mail address of the administrator, the telephone number of the administrator, the fax number of the administrator, and the last update time.

The link file display component 504 can also be divided into a user registration file display component and a channel registration file display component, so that the link files personally registered by a user are displayed separately from link files registered as related with a channel.

When there is a notification to the effect that the information has been updated for a link file registered to the link file table 231, information update notification is performed on the basic screen 501. For instance, as shown in FIG. 27, an information update notification can be performed by displaying check marks superposed over the link file icons 511 and 513 corresponding to the link files for which the information update notification is to be performed. Here again, the update details, update time, updating person, and other such update information can be displayed by positioning the mouse pointer over the link file icons 511 and 513 where the check marks are displayed.

The system can also be configured so that the check marks indicating the information update notification are no longer displayed after the update information has been displayed for a specific length of time or a specific number of times. In this case, the update information is reflected in the basic information and registered in the link file table 231, and can be viewed at any time by positioning the mouse pointer over the link file icons 511 to 515.

Second Embodiment

Figure 3:
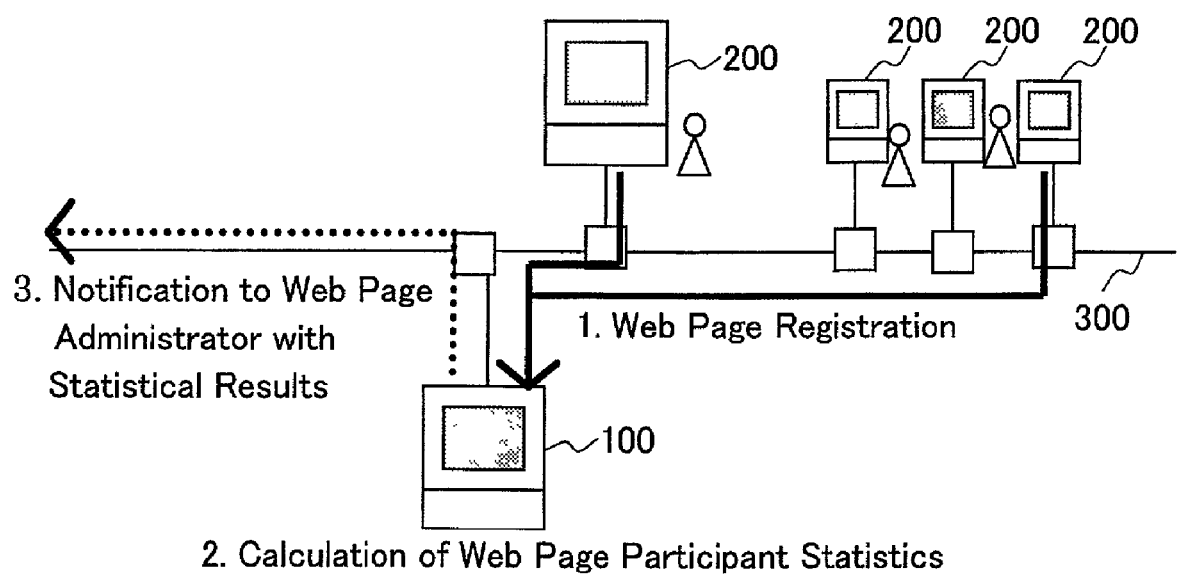
FIG. 3 is a schematic representation of the configuration of the second embodiment.

FIG. 3 is a schematic view of the configuration of the second embodiment.

Here, when a link file is registered at the client terminal 200, that registration information is sent to the server terminal 100. This registration information is statistically processed at the server terminal 100, and if a web page is registered as the link file, for example, then the administrator of that web page is notified of the statistical information.

Figure 11:
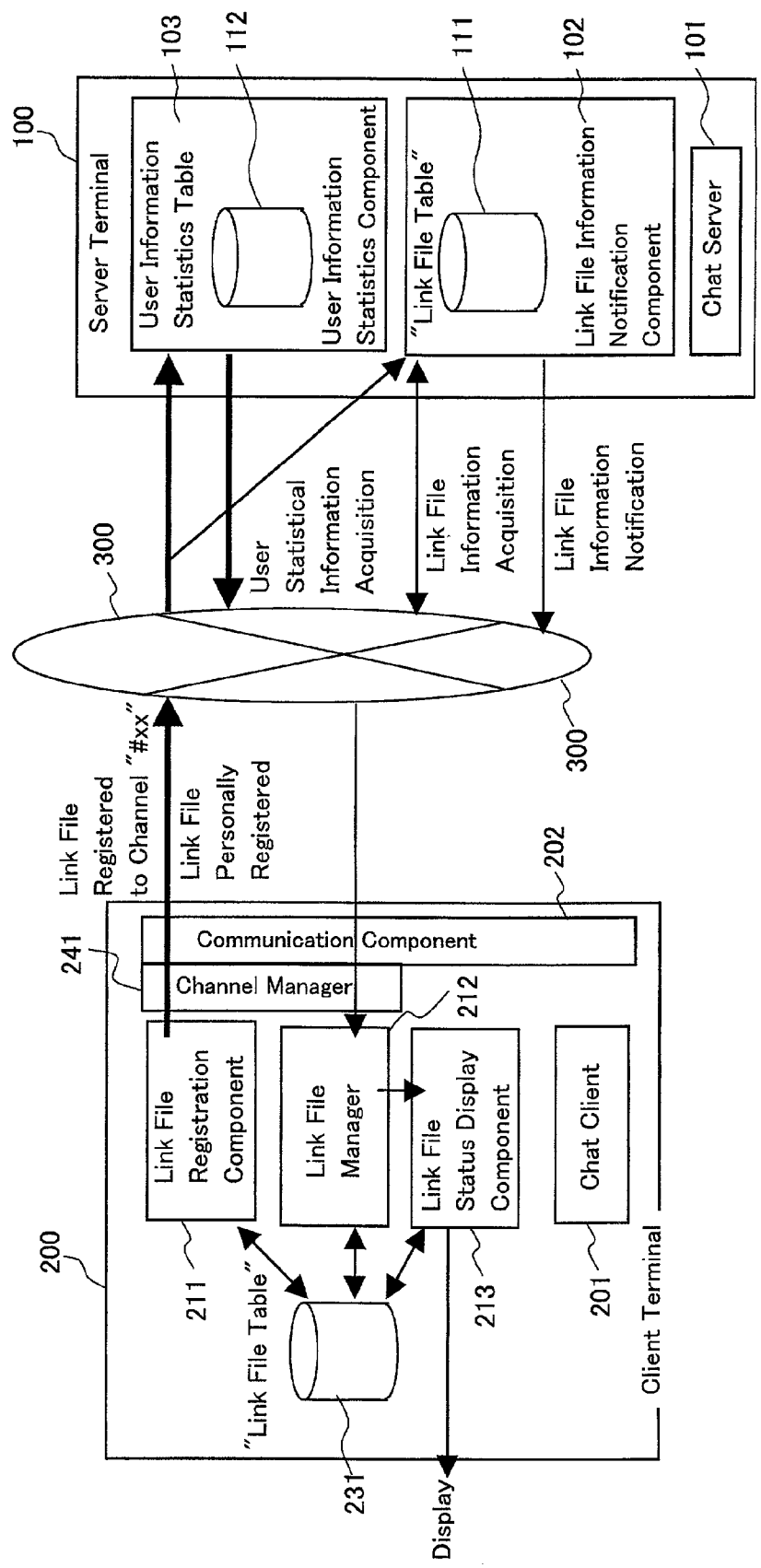
FIG. 11 is a control block diagram of the second embodiment.

FIG. 11 is a control block diagram for configuring this second embodiment.

The client terminal 200 is configured the same as the client terminal 200 in the first embodiment, and will not be described in detail again.

The server terminal 100 includes a chat server 101 that broadcasts to chat clients chat contents carried on within the various channels on the network 300, a link file table 111 that manages the link file names registered to each client using link file registration information about which notification has been given by the various client terminals 200, and a link file information notification component 102 that acquires information pertaining to the link files and notifies the registered clients of these link files.

The chat server 101, link file table 111, and link file information notification component 102 are configured the same as in the first embodiment, and will not be described in detail again.

The server terminal 100 further includes a user statistics component 103 that acquires user information about a user that registered a link file in a client terminal 200, and notifies the administrator of the link file of statistical information based on this user information. The link file registration here can correspond either to a case when the user personally performs the link file registration, or to a case when the link file registration is performed as related with the channel in which the user is participating.

The user statistics component 103 acquires user information pertaining to the user that registered the link file, and manages a user information statistics table 112 for storing this user information.

The user information statistics table 112 can be configured as shown in Table 3, for example.

TABLE 3

| Link File Name | | http://xxx.y.z/abc.html | | | | ... |
|---|---|---|---|---|---|---|
| Nick Name | Oku | tanaka | sasaki | suzuki | yamada | ... |
| Sex | M | F | F | M | M | ... |
| Age | 34 | 29 | 21 | 47 | 25 | ... |
| ... | ... | ... | ... | ... | ... | ... |

This user information statistics table 112 consists of link file names, nicknames, sex, age, and other such categories. To give an example of this data, for the web page "http//xxx.y.z/home/abc.html" registered as the link file from the client terminal 200, the user nickname, sex, age, and other such details registered as the link file are stored in their respective columns.

In addition to the nickname, sex, and age shown in Table 3, examples of possible user information include marital status, occupation, mailing address, interests, and so forth.

The user statistics component 103 performs statistical processing for each web page registered as a link file using user information stored in the user information statistics table 112, and notifies the administrator of the link file of these statistical results.

Figure 28:
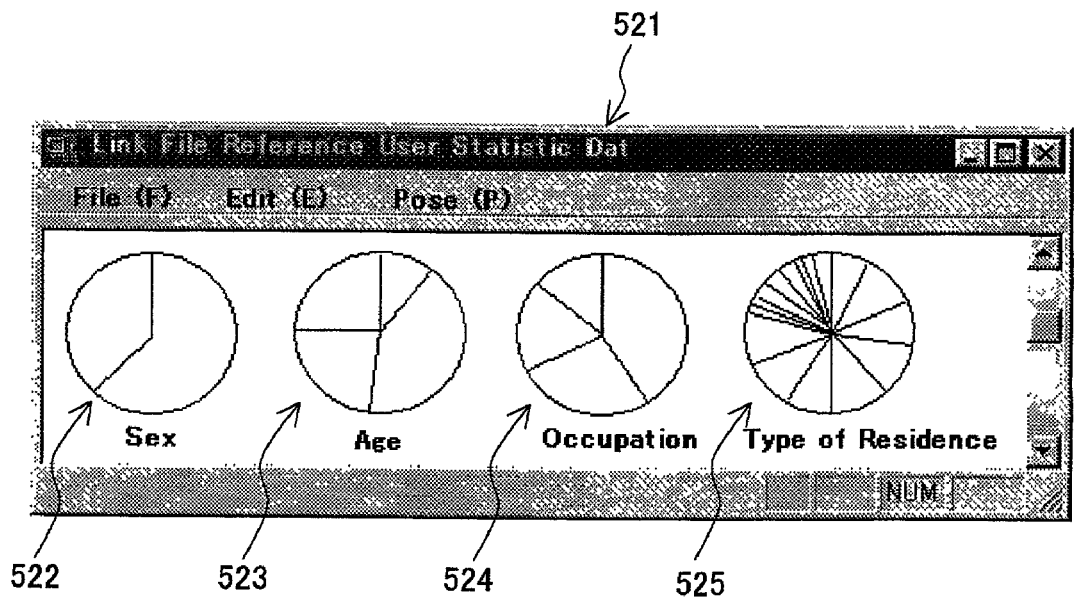
FIG. 28 is a diagram related to the screen display of statistical processing information.

The user statistical data statistically processed by the user statistics component 103 can be obtained, for example, by calculating percentages by sex, age group, occupational category, and residential region. FIG. 28 shows an example of displaying user statistical data. Here, a user statistical data display screen 521 is configured such that a sex data pie chart 522, an age group pie chart 523, an occupational category pie chart 524, and a residential region pie chart 525 are displayed.

Operations of the Second Embodiment

Figure 19:
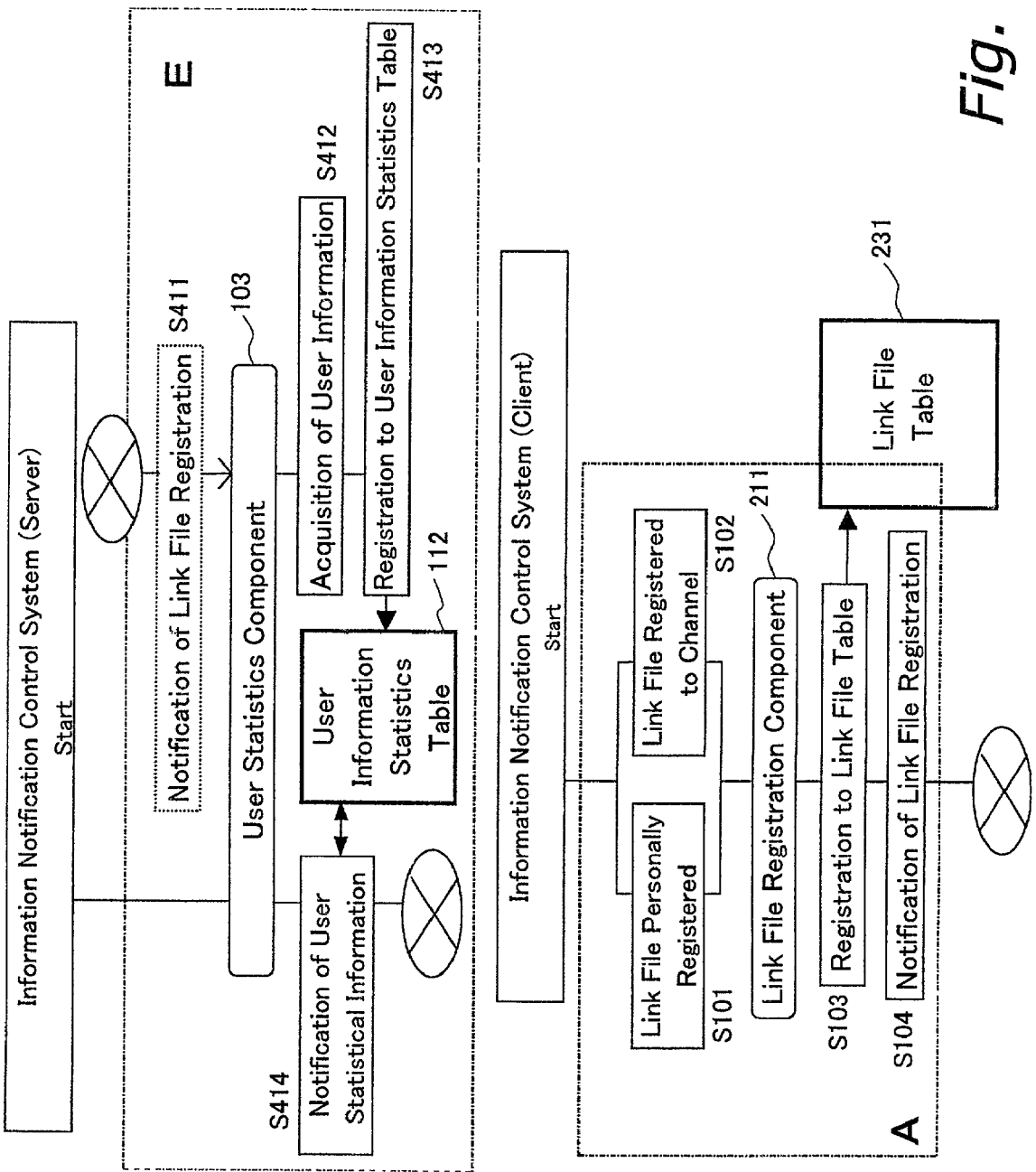
FIG. 19 is a control flow chart of the second embodiment.

FIG. 19 is a flow chart of the operations in this second embodiment.

The operation on the client terminal 200 side is labeled processing A, while the operation on the server terminal 100 side is labeled processing E.

(A) The operation in which link file registration is performed at the client terminal 200 is the same as in the first embodiment (FIG. 18A), and will not be described in detail again.

(E) In processing E, data for producing statistics upon receipt of a link file registration from the client terminal 200 is produced by the server terminal 100, and after a suitable amount of data has accumulated, it is analyzed and sent to the administrator of that link file.

When there is notification of the registration of a link file from the client terminal 200 at the server terminal 100 (step S411), the user statistics component 103 acquires user information pertaining to the name of the link file and to the user who performed registration (step S412). If the chat system contains a member database in which personal information is registered, then the user information is retrieved from this member database. Otherwise, if personal information registered in a directory service can be acquired using a user ID or the like as a key, then it is also possible to utilize this information. The user statistics component 103 registers the acquired user information to the user information statistics table 112 (step S413), and performs statistical processing and notifies the web page administrator of these statistical results (step S414).

Third Embodiment

Figure 4:
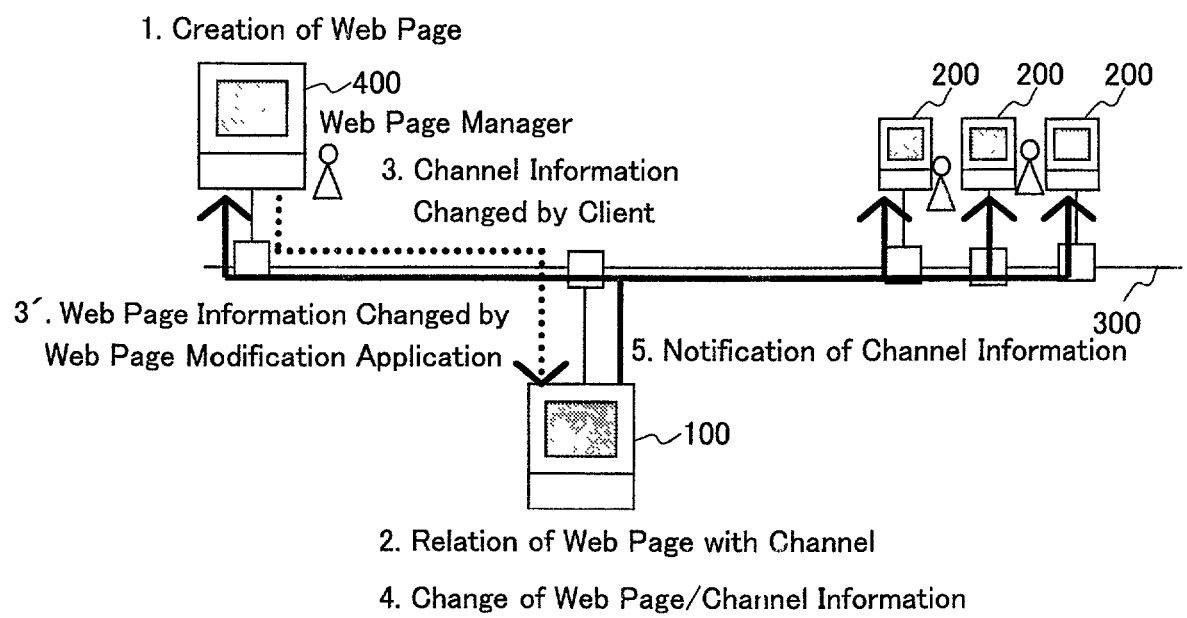
FIG. 4 is a schematic representation of the configuration of the third embodiment.

FIG. 4 is a schematic view of the configuration of the third embodiment.

Here, the server terminal 100, the client terminal 200, and a web page administrator terminal 400 are connected to the network 300. The web page administrator terminal 400 is able to register a managed web page as a link file related with a channel. The correspondence between a registered channel and a web page is registered to a channel/file management table 113 of the server terminal 100. If there is a change in the content of a web page, a notice is sent from the web page administrator terminal 400 to the server terminal 100 as update information for the channel to which that link file is registered, and the content of the channel/file management table 113 is updated. At the same time, the various other client terminals 200 participating in that channel are notified of the update information. If there is a change in the channel information, the content of the channel/file management table 113 of the server terminal 100 is updated, and the web page administrator terminal 400 registered as the link file is notified of the update information so that the content of the web page will be changed using the update information.

Figure 12:
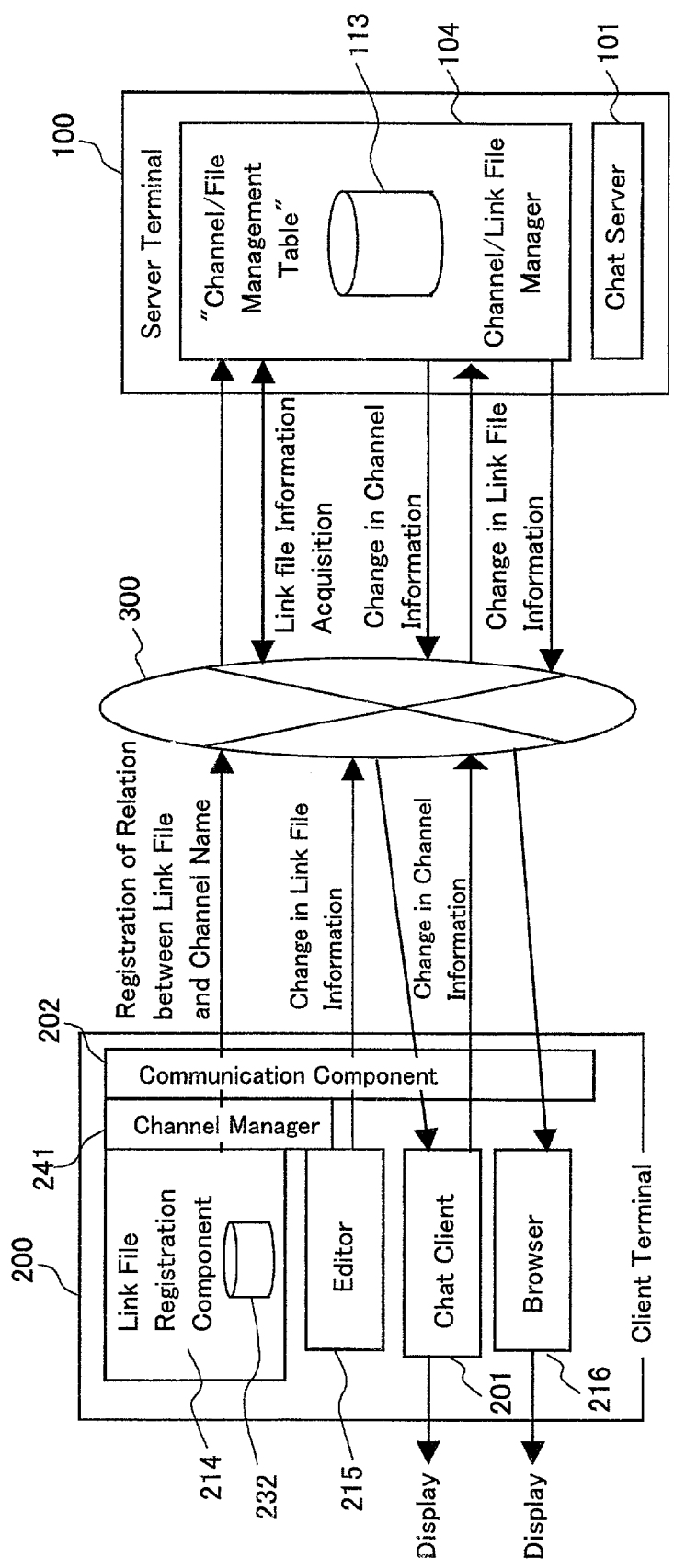
FIG. 12 is a control block diagram of the third embodiment.

FIG. 12 is a control block diagram for configuring this third embodiment.

The web page administrator terminal 400 can be configured with the same system as the other client terminals 200, and here we will consider a system in which the server terminal 100 and the various client terminals 200 are connected to the network 300.

The client terminal 200 (the web page administrator terminal 400), just as in the above embodiment, includes a chat client 201 that sends and receives text messages to and from other client terminals 200 through the network 300, a communication component 202 that sends and receives data to and from the network 300, and a channel manager 241 that manages the channel used by the user at the chat client 201.

Just as in the above embodiment, the chat client 201 receives character string input from the user and sends it through the communication component 202 as a text message within the channel, and receives text messages from the chat clients 201 of other client terminals 200. The chat content of the channel in which the user is currently participating is selected by the channel manager 241 and displayed on the client terminal 200.

The client terminal 200 (the web page administrator terminal 400) also includes a link file registration component 214 that receives from a user a request for the registration of a link file and performs link file registration, and sends the registration information for this link file to the server terminal 100 side through the network 300. Here, when a link file is registered as related with the channel in which the user is participating, the link file registration component 214 receives this registration request and sends a registration notification to the server terminal 100. The link file registration component 214 manages a channel/link file relation table 232, manages the correspondence between the channel and the link file, and, if there is a change in this correspondence, updates the channel/link file relation table 232. The channel/link file relation table 232 can make use of a table such as that in Table 1 in the first embodiment.

The client terminal 200 is also equipped with an editor 215 for changing the content of web pages, document files, and so forth that are registered as link files, and a browser 216 for displaying on a display device the content of web pages, document files, and so forth that are registered as link files. When the content of a web page is in HTML, the editor 215 can be Microsoft Front page, Netscape Communicator, IBM Japan Web Page Builder, or any of various other HTML editors. The editor 215 can be any standard WWW browser such as Microsoft Internet Explorer or Netscape Navigator.

At the client terminal 200 (the web page administrator terminal 400), it is conceivable that the user will produce a web page and register it as a link file related with a channel. It is also possible that another user participating on that channel will register a web page managed by another client terminal 200 (web page administrator terminal 400) as a link file related with a channel. In either case, this registration request is received by the link file registration component 214, and the server terminal 100 is notified of the registration.

Just as in the first embodiment, the server terminal 100 is equipped with a chat server 101 that broadcasts to chat clients chat contents carried on within the various channels on the network 300. The server terminal 100 is further equipped with a channel/file management table 113 for managing the correspondence between a channel and a link file using registration information of a link file about which notification has been given by various client terminals 200, and a channel/link file manager 104 that acquires information pertaining to a channel and a link file, updates the contents of the channel/file management table 113, and notifies the various client terminals of the update information.

The channel/file management table 113 of the server terminal 100 can be configured as shown in Table 2, just as in the first embodiment.

Operations of the Third Embodiment

Figure 20:
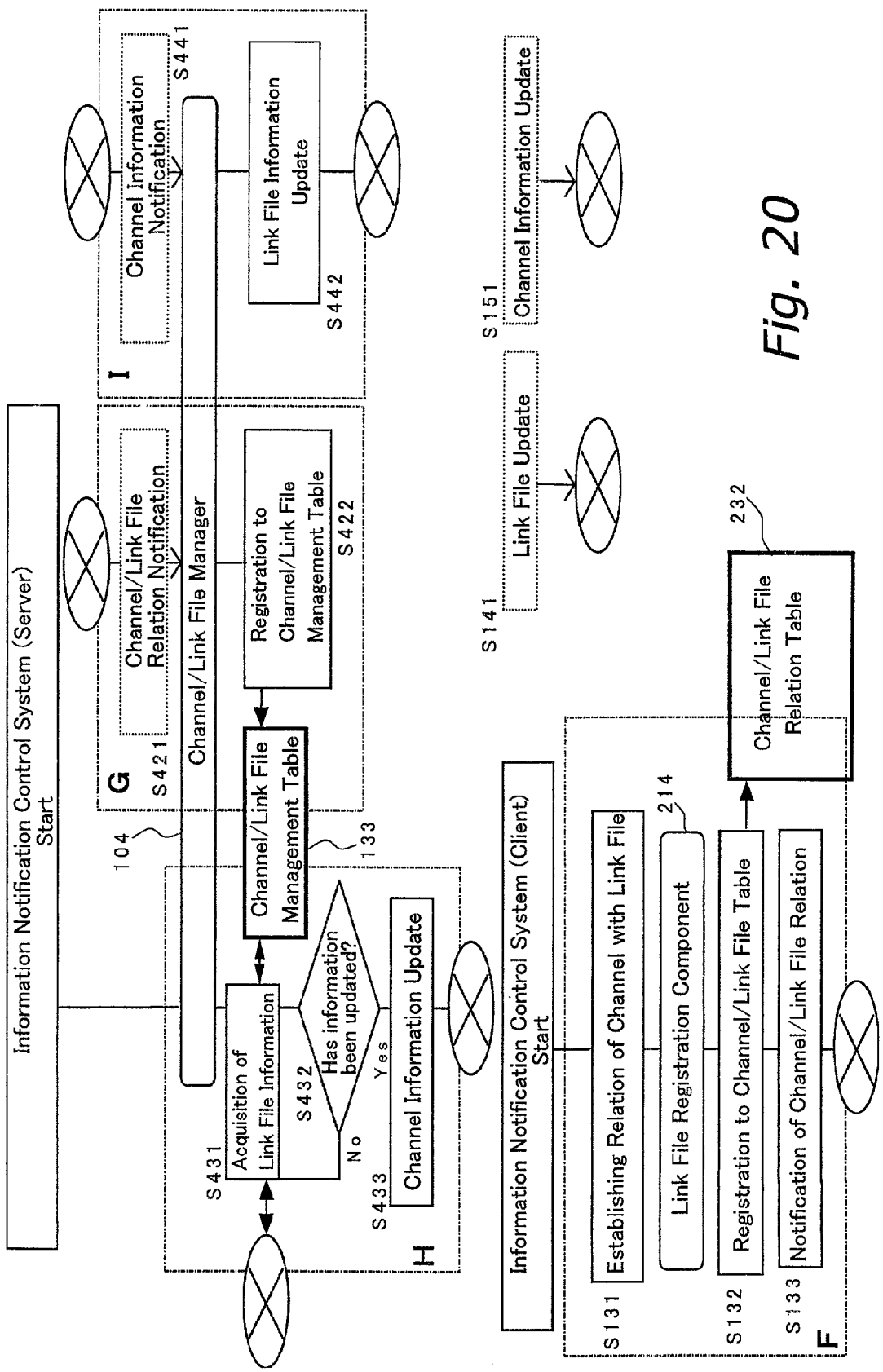
FIG. 20 is a control flow chart of the third embodiment.

FIG. 20 is a flow chart of the operations in this third embodiment.

The operation on the client terminal 200 side is labeled as processing F, and the operations on the server terminal 100 side are labeled as processing G, H, and I.

(F) Processing F is executed on the client side when the client terminal 200 (the web page administrator terminal 400) registers a web page as a link file of a channel.

At the client terminal 200, when there is a request from the user for registration that relates a channel with a link file (step S131), the correspondence between the channel and link file for which registration has been requested is registered to the channel/link file relation table 232 by the link file registration component 214 (step S132), and this registration information is sent to the server terminal 100 side (step S133).

Figure 29:
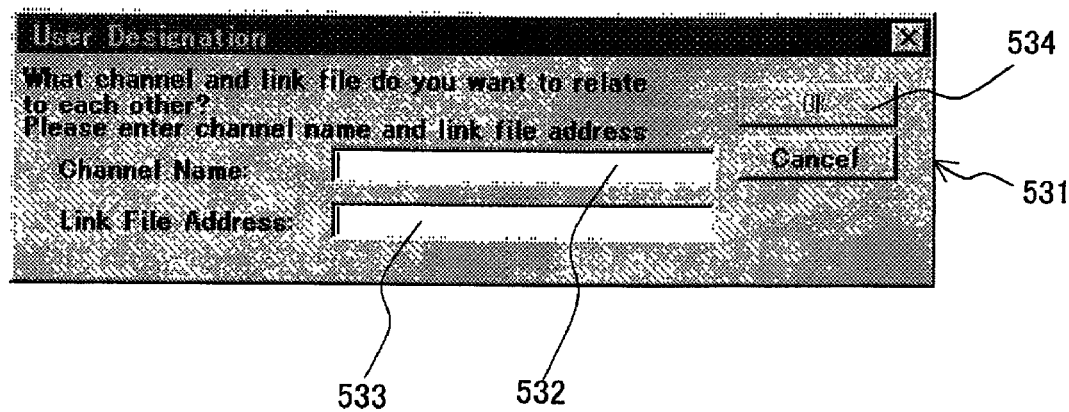
FIG. 29 is a diagram illustrating a link file registration screen.

When there is a command from the user to register a link file related with a channel, the link file registration component 214 puts up a link file registration screen as shown in FIG. 29. The link file registration screen 531 is provided with a channel name input component 532, a link file address input component 533, an OK button 534, and so forth. When the user inputs a channel name and link file address into the channel name input component 532 and link file address input component 533, and then clicks on the OK button 534, the link file registration component 214 receives a registration request that relates the inputted channel name with the inputted link file address.

In addition to the processing F in FIG. 20, the updating of the link file contents and the updating of the channel information can also be performed at the client terminal 200 (the web page administrator terminal 400).

When the editor 215 of the client terminal 200 (the web page administrator terminal 400) is used to change the content of a web page registered as a link file related with a channel, the update information about the link file is sent through the network 300 to the server terminal 100 side (step S141). Possible information pertaining to the web page updated by the client terminal 200 (the web page administrator terminal 400) here include update items collected under the heading "What's new," icons, background, access users, and so forth.

When channel information has been updated by the chat client 201 of the client terminal 200, this channel update information is sent through the network 300 to the server terminal 100 side (step S151). Possible channel information that can be changed by the client terminal 200 here include topics, icons, wallpaper, viewable user names, and so forth.

The channel update information about which notification has been given by the server terminal 100 is displayed by the chat client 201, and each user is able to check on this. Also, the link file update information about which notification has been given by the server terminal 100 is displayed by the browser 216, and each user is able to check on this.

(G) Processing G is executed on the server side when the client terminal 200 (the web page administrator terminal 400) registers a web page as a link file of a channel.

At the server terminal 100, when there is a link file registration notification from the client terminal 200 (step S421), this registration information is registered to the channel/file management table 113 in the channel/link file manager 104 (step S422).

(H) Processing H involves monitoring the update situation of web pages and the like registered as link files in the server terminal 100, managing the update situation, and notifying client terminals.

The channel/link file manager 104 of the server terminal 100 acquires information pertaining to link files registered to the channel/file management table 113 at a timing set by the system or a timing suitably set by the user (step S431). With the channel/file management table 113, a link file name registered to a channel is managed by its URL as shown in Table 2. With the channel/link file manager 104, information pertaining to link files is acquired by accessing this URL when the link file registration is carried out. The channel/link file manager 104 accesses this URL at specific intervals using a timing set by the system or a timing set by the user, and acquires information about a web page registered as a link file.

The channel/link file manager 104 determines whether the acquired information pertaining to a link file has been updated or not (step S432), and if the determination is that it has been updated, the contents of the channel/file management table 113 are updated, and an information update notification is performed for the channel where this link file is registered (step S433).

(I) At the server terminal 100, when an update notification is received for channel information (step S441), the channel/link file manager 104 updates the information in the channel/file management table 113 and sends update information to a link file related with a channel, and the update information is reflected in the web page registered as this link file (step S442).

Fourth Embodiment

Figure 5:
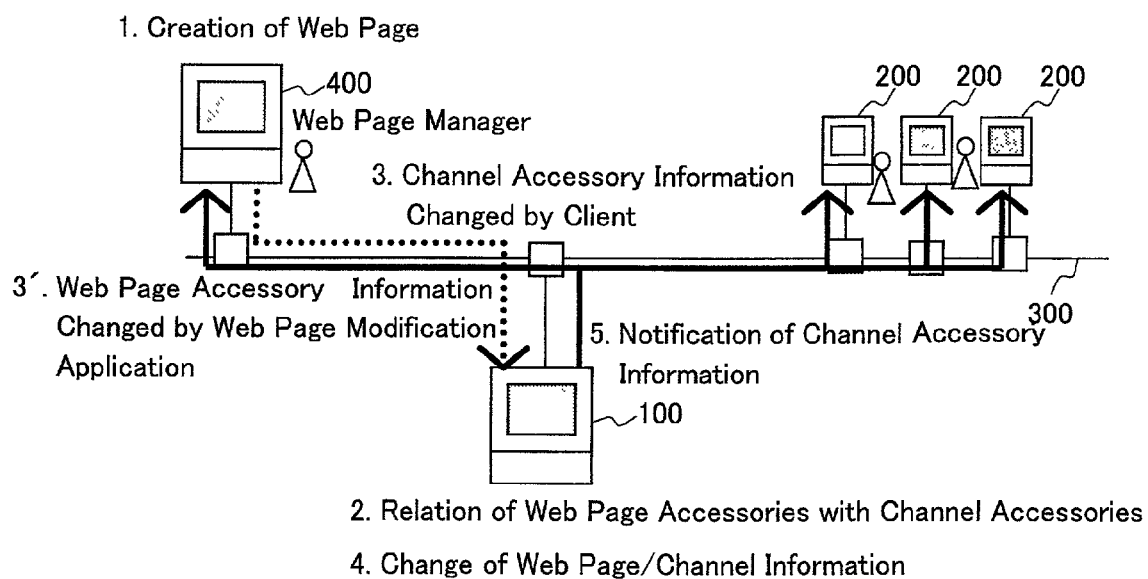
FIG. 5 is a schematic representation of the configuration of the fourth embodiment.

FIG. 5 is a schematic view of the configuration of the fourth embodiment.

Here, just as in the third embodiment, the server terminal 100, the client terminal 200, and the web page administrator terminal 400 are connected to the network 300. The web page administrator terminal 400 is able to register a managed web page as a link file related with a channel. It is possible at this point to register an accessory of a web page to a channel. An accessory of a web page can be registered as an accessory of a channel. A web page accessory may be a software download page or a document linked as hypertext or the like on a web page, a Java applet operating on a web page, or the like, and examples of linked documents include product descriptions and news stories.

The correspondence between a registered channel and a web page and its accessories is registered to a channel/file management table 114 of the server terminal 100. If there is a change in the content of a web page from the web page administrator terminal 400, a notice is sent to the server terminal 100 as update information for the channel to which that web page is registered as a link file, and the content of the channel/file management table 114 is updated. At the same time, the various other client terminals 200 participating in that channel are notified of the update information. Similarly, if there is a change in the information about the web page accessory registered to the channel, a notice is sent to the server terminal 100 as update information for the channel to which that web page is registered as a link file, and the content of the channel/file management table 114 is updated. Possible information about a web page accessory includes detailed information pertaining to icons and content. At the same time, update information is sent to the various client terminals 200 participating on that channel.

When there has been a change in the channel information, the contents of the channel/file management table of the server terminal 100 are updated, notification of update information is sent to the web page administrator terminal 400 registered as a link file, and the content of the web page is changed using the update information.

Figure 13:
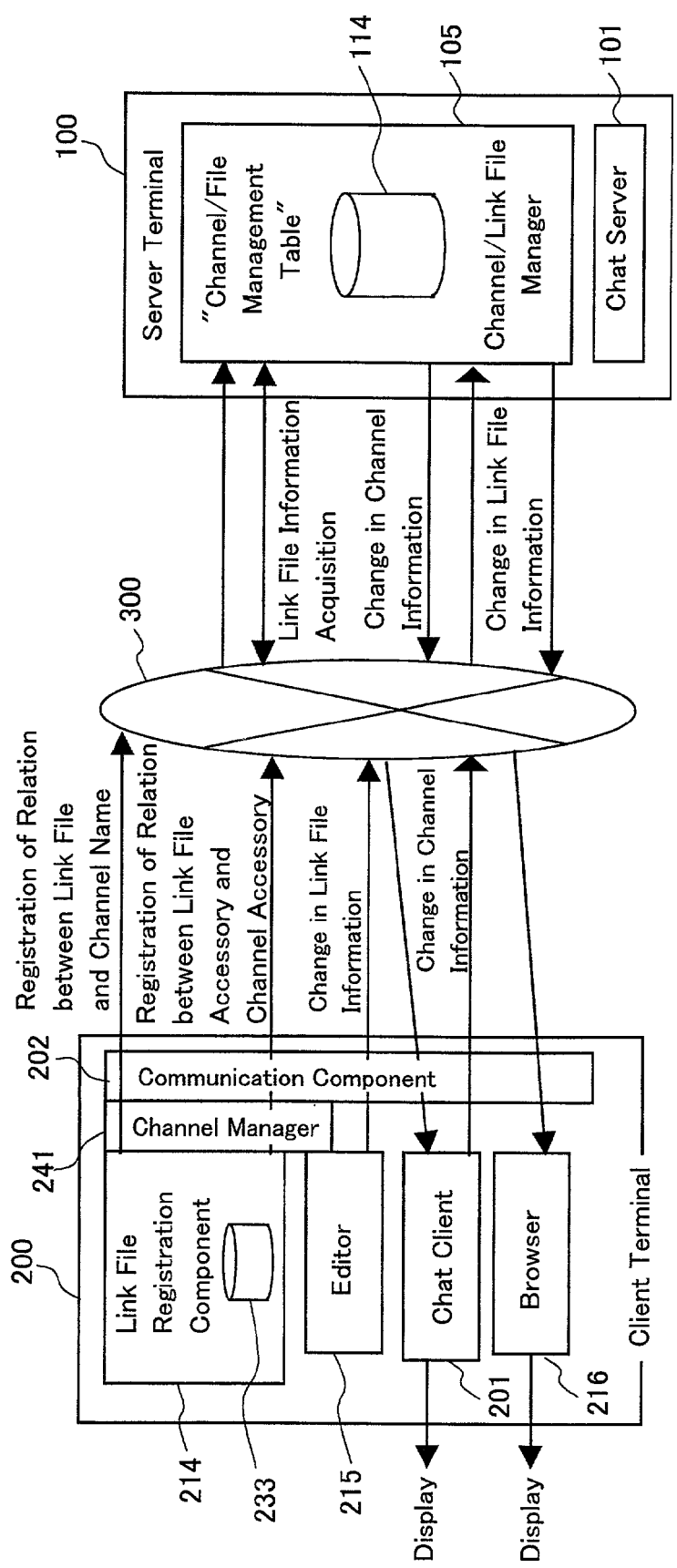
FIG. 13 is a control block diagram of the fourth embodiment.

FIG. 13 is a control block diagram for configuring the fourth embodiment.

The configuration shown in FIG. 13 is substantially the same as that used in the third embodiment, with the server terminal 100 and the client terminal 200 being connected to the network 300; the function of the web page administrator terminal 400 is assigned to the client terminal 200.

The client terminal 200 (web page administrator terminal 400) includes a chat client 201 that sends and receives text messages to and from other client terminals 200 through the network 300, a communication component 202 that sends and receives data to and from the network 300, and a channel manager 241 that manages the channel used by the user at the chat client 201.

Just as in the above embodiment, the chat client 201 receives character string input from the user and sends it through the communication component 202 as a text message within the channel, and receives text messages from the chat clients 201 of other client terminals 200. The chat content of the channel in which a user is currently participating is selected by the channel manager 241 and displayed on the client terminal 200.

The client terminal 200 also includes a link file registration component 214 that receives from a user a request for the registration of a link file and performs link file registration, and sends the registration information for this link file to the server terminal 100 side through the network 300. Here, when a link file is registered as related with the channel in which the user is participating, the link file registration component 214 receives this registration request and sends a registration notification to the server terminal 100. Similarly, when a link file accessory is registered as related with a channel, the link file registration component 214 receives this registration request and sends a registration notification to the server terminal 100.

The link file registration component 214 manages a channel/link file relation table 233, manages the correspondence between a channel and a link file and link file accessories, and, if there is a change in this correspondence, updates the channel/link file relation table 233.

Just as in the above embodiment, the server terminal 100 includes a chat server 101 that broadcasts to chat clients chat contents carried on within the various channels on the network 300. The server terminal 100 includes a channel/file management table 114 for managing the correspondence between the channel and the link file using the registration information of the link file about which notification has been given by the various client terminals 200, and a channel/file manager 105 that acquires information pertaining to the channel and the link file, updates the contents of the channel/file management table 114, and notifies the various client terminals of the update information.

The channel/file management table 114 of the server terminal 100 can be configured as shown in Table 4, for example.

TABLE 4

| Channel Name | Link File Name | Information | Accessory | |
|---|---|---|---|---|
| #aa | http://xxx.y.z/abc.html | E-Mail:abc@xxx.y.z. Tel:xxx-xx-xxxx Fax:xxx-xx-xxxx Date:2000/08/31 10:10:10 Background Pattern:aa.jpg Topic:Full of New Products♪ Icon:aa.ico | Product 1 | Date:2000/08/31 10:10:10 Icon:ab.iccc Status:in stock Popularity:A . . . Detailed Information: Price Color Size . . . |
| | | | Product 2 | Date:2000/08/31 10:10:10 Icon:ac.iccc Status:in stock Popularity:A . . . |

TABLE 4-continued

| Channel Name | Link File Name | Information | Accessory | |
|---|---|---|---|---|
| | | | | Detailed Information: Price Color Size . . . |
| | | | Product 3 | Date:2000/08/31 10:10:10 Icon:ac.iccc Status:in stock Popularity:A . . . Detailed Information: Price Color Size . . . |
| | | | . . . | . . . |
| #abc | http://xxx.y.z/dfae.html | E-Mail:dfae@xxx.y.z Tel:xxx-xx-xxxx Fax:xxx-xx-xxxx Date:2000/05/24 10:10:10 Background Pattern:dfae.jpg Topic:Today's event is ○○. Icon:dfae.ico . . . | Event 1 | Date:2000/05/24 10:10:10 Icon:dfae1.iccc Status:Unoccupied Popularity:A . . . Detailed Information: Price Available Number Schedule . . . . . . |
| | | | Event 2 | Date:2000/05/24 10:10:10 Icon:dfae2.iccc Status:Unoccupied Popularity:B . . . Detailed Information: Price Available Number Schedule . . . . . . |
| | | | Event 3 | Date:2000/05/24 10:10:10 Icon:dfae3.iccc Status:Unoccupied Popularity:A . . . Detailed Information: Price Available Number Schedule . . . . . . |
| | | | . . . | . . . |
| . . . | . . . | . . . | . . . | . . . |

As shown in Table 4, the channel/file management table 114 consists of the categories of channel names, link file names, information, and accessories. The name of a channel that has undergone link file registration on the client terminal 200 side is stored in the channel name column. The address of the web page registered to this channel is stored in the link file name column. In the example given here an HTML URL expressed by "http// . . . " is stored in the column. The e-mail address of the manager of the web page registered as a link file, the telephone number of the administrator, the fax number of the administrator, or other such basic information, or update information such as the last update time or the updating person, or the like is stored in the information column. In this example, information about the accessories of this web page is stored in the accessory column. In this example, information about "Product 1" to "Product 3" is stored as accessories of "http//xxx.y.z/abc.html," while information about "Event 1" to "Event 3" is stored as accessories of "http//xxx.y.z/dfae.html," and the creation date of the various accessories, icons, and other detail information is also stored.

Operations of the Fourth Embodiment

Figure 21:
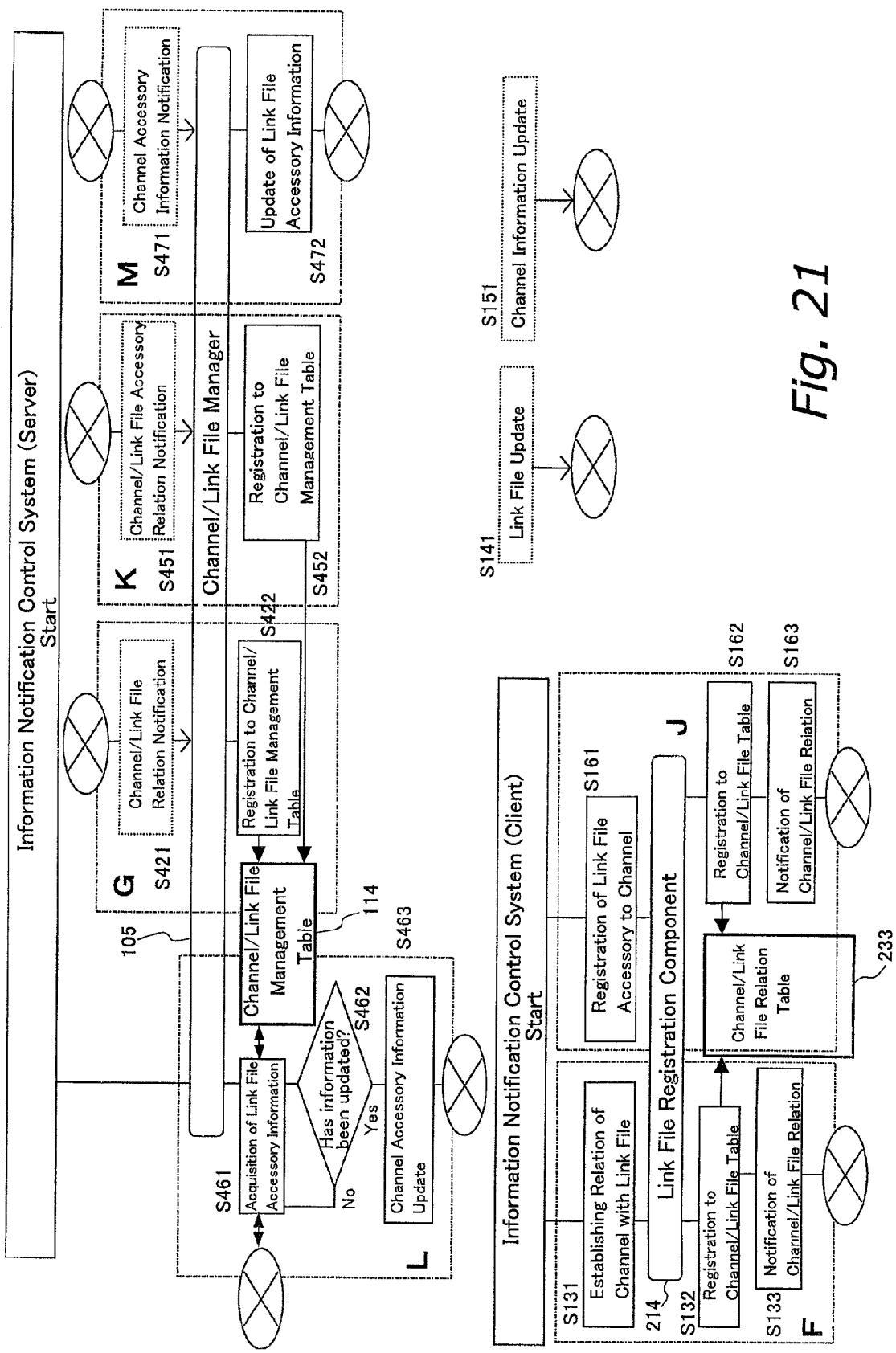
FIG. 21 is a control flow chart of the fourth embodiment.

FIG. 21 is a flow chart of the operations in this fourth embodiment.

The operations on the client terminal 200 (web page administrator terminal 400) side are labeled as processing F and J, and the operations on the server terminal 100 side are labeled as processing G, K, L, and M.

(F) When there is a request from a user for registration that relates a channel with a link file at the client terminal 200, the same operation is performed as in the flow chart of processing F in FIG. 20, so this will not be described in detail again.

(J) When there is a request from a user for registration that relates a channel with a link file accessory at the client terminal 200 (step S161), the correspondence between the link file accessories and the channel for which registration has been requested is registered to a channel/link file relation table 233 by the link file registration component 214 (step S162), and this registration information is sent to the server terminal 100 side (step S163).

Figure 30:
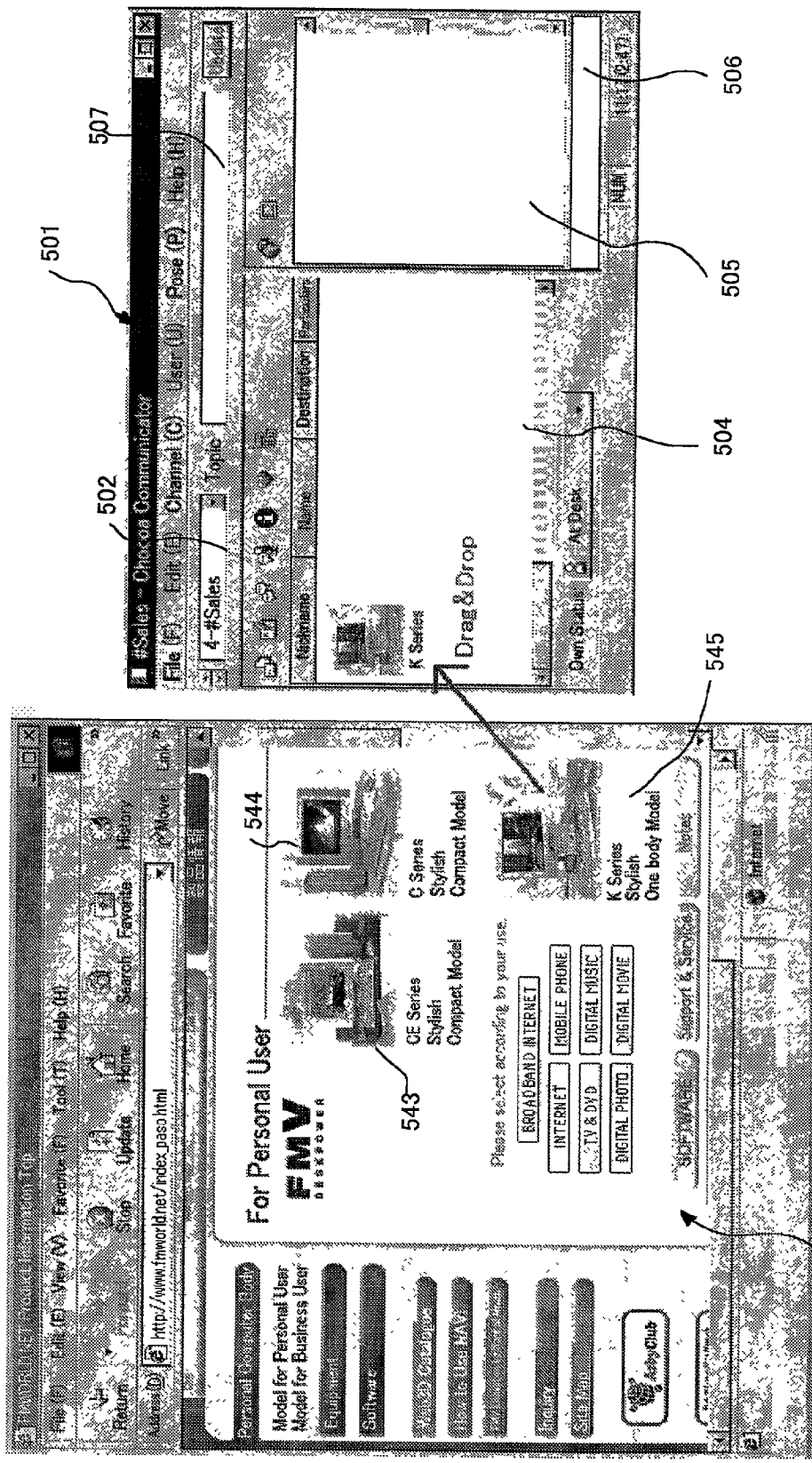
FIG. 30 is a diagram related to the screen display of the registration of an accessory.

When the user registers a link file accessory related with a channel, as shown in FIG. 30, for example, the basic screen 541 of the browser 216 and the basic screen 501 of the chat client 201 are displayed simultaneously on a display device of the client terminal 200.

The web page to be registered to the channel is accessed by the browser 216, and this web page is displayed on a window 542 of the basic screen 541. As shown in the drawing, this results in accessories 543 to 545 in the web page being displayed in the window 542. In this example, documents pertaining to product descriptions are put up as accessories in hypertext format.

The basic screen 501 of the chat client 201 includes the channel selector 502, the topic display component 507, a channel participant display component, the link file display component 504, the chat log display component 505, the chat input component 506, the user status button 508, and so on. In this drawing, though, the screen is in a mode in which the channel participant display component is not displayed.

A web page accessory can be copied to the chat client 201 by positioning the mouse pointer over one of the web page accessories 543 to 545 displayed in the window 542 of the browser 216, moving the mouse pointer over the link file display component 504 of the chat client 201 while holding down the left button, and then releasing the left button (drag and drop). In this way it is possible for a web page accessory to be registered as related with the channel currently displayed by the chat client 201.

At the client terminal 200, it is possible for various types of information to be updated using the channel update information or link file update information about which notification has been given by the server terminal 100 side (steps S141 and S151). This operation is the same as in the third embodiment, and will not be described again.

Figure 31:
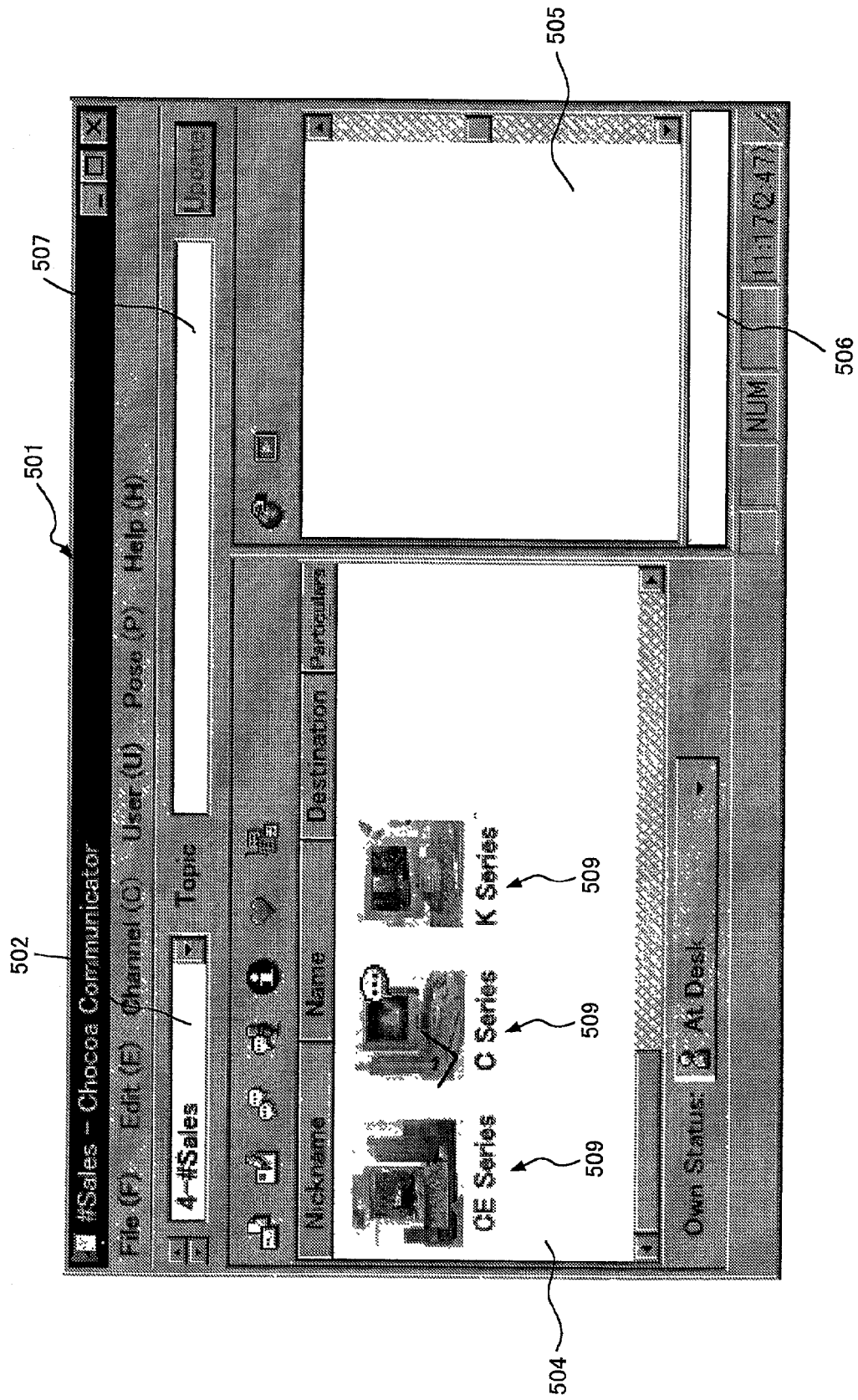
FIG. 31 is a diagram related to the screen display of the update information of an accessory.

When update information pertaining to a link file accessory is received by the client terminal 200 from the server terminal 100, there is a display indicating that there has been an update pertaining to a channel accessory, as shown in FIG. 31.

Just as above, the basic screen 501 of the chat client 201 in FIG. 31 includes the channel selector 502, the topic display component 507, the link file display component 504, the chat log display component 505, the chat input component 506, the user status button 508, and so on. Here, link file accessories related with the currently displayed channel are displayed as accessory display icons 509 on the link file display component 504. If update information has been received from the server terminal 100 for any of these, a check mark is displayed superposed over the accessory display icon 509 (the product "C series" accessory display icon 509 in the middle in FIG. 31).

On the client terminal 200 side, a link file accessory can be updated using update information by clicking on any of the accessory display icons 509 displayed on the link file display component 504 that are displayed with a superposed check mark.

(G) When there is a link file registration notification from the client terminal 200 at the server terminal 100 (step S421), this registration information is registered to the channel/file management table 114 in the channel/file manager 105 (step S422).

(K) When there is a registration notification for a link file accessory with respect to a channel from the client terminal 200 at the server terminal 100 (step S451), this registration information is registered to the channel/file management table 114 in the channel/file manager 105 (step S452).

In the example in Table 4, "Product 1" to "Product 3" which are accessories of the web page "http//xxx.y.z/abc.html" are registered to channel "#aa," while "Event 1" to "Event 3" which are accessories of the web page "http//xxx.y.z/dfae.html" are registered to the channel "#abc," according to the registration request from the client terminal 200.

(L) The channel/file manager 105 of the server terminal 100 acquires information pertaining to an accessory of a link file registered to the channel/file management table 114 at a timing set by the system or a timing suitably set by the user (step S461). With the channel/file manager 105, when a link file accessory has been registered to a channel, this URL is accessed and information pertaining to the link file accessory is acquired. The channel/file manager 105 accesses this URL at specific intervals using a timing set by the system or a timing set by the user, and acquires information pertaining to the registered link file accessory.

The channel/file manager 105 determines whether the acquired information pertaining to a link file accessory has been updated or not (step S462), and if the determination is that it has been updated, the contents of the channel/file management table 114 are changed, and an information update notification is performed for the channel where this link file accessory is registered (step S463).

It is also possible for the configuration to be such that update notifications about link file accessories are received by the server terminal 100 as they come in from the web page manager terminal managing the web page, and when this update notification has been received, the channel/file manager 105 actually accesses the web page and acquires update information, the contents of the channel/file management table 114 are updated, and an update notice is sent to the client terminal 200.

As a result, when information about a web page accessory (such as an icon or detail information) changes, this update information is acquired by the server terminal 100, and the client terminal 200 is notified, so it is easy to recognize the update information at the client terminal 200.

(M) When an update notification for information about a channel accessory has been received at the server terminal 100 (step S471), the channel/file manager 105 updates the information in the channel/file management table 114 and performs notification with the update information to the link file related with the channel, and the update information is reflected in this link file accessory (step S472).

When there has been a change in information (such as an icon or detail information) about a web page accessory related with a channel, the update information is reflected by the server terminal 100 in the web page, so it is possible to confirm this update information at other various client terminals 200 as well, and update information can be obtained substantially in real time.

Fifth Embodiment

Figure 6:
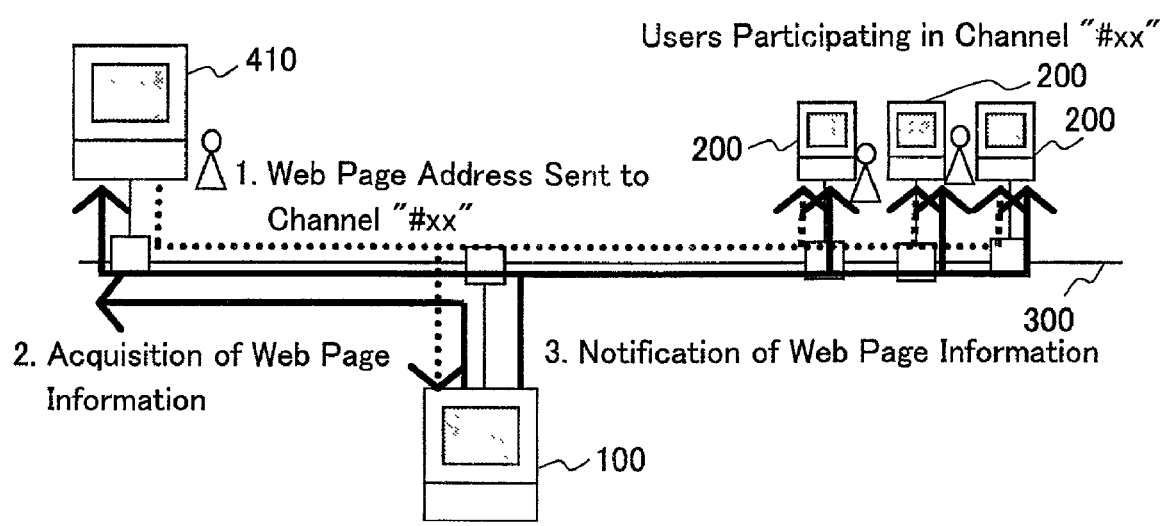
FIG. 6 is a schematic representation of the configuration of the fifth embodiment.

FIG. 6 is a schematic view of the configuration in the fifth embodiment.

Here, the server terminal 100, the client terminal 200, and a channel message contributor terminal 410 are connected to the network 300. The client terminal of a user who contributes to a channel a message that includes a web page address will for the sake of convenience be referred to herein as the channel message contributor terminal 410, and this channel message contributor terminal 410 is configured the same as the other various client terminals 200.

The client terminal 200 determines whether a web page address included in a message sent to a channel by the channel message contributor terminal 410 is to be registered as a link file, and if it is, then information pertaining to that link file is acquired through the server terminal 100 and managed by a link file table.

Figure 14:
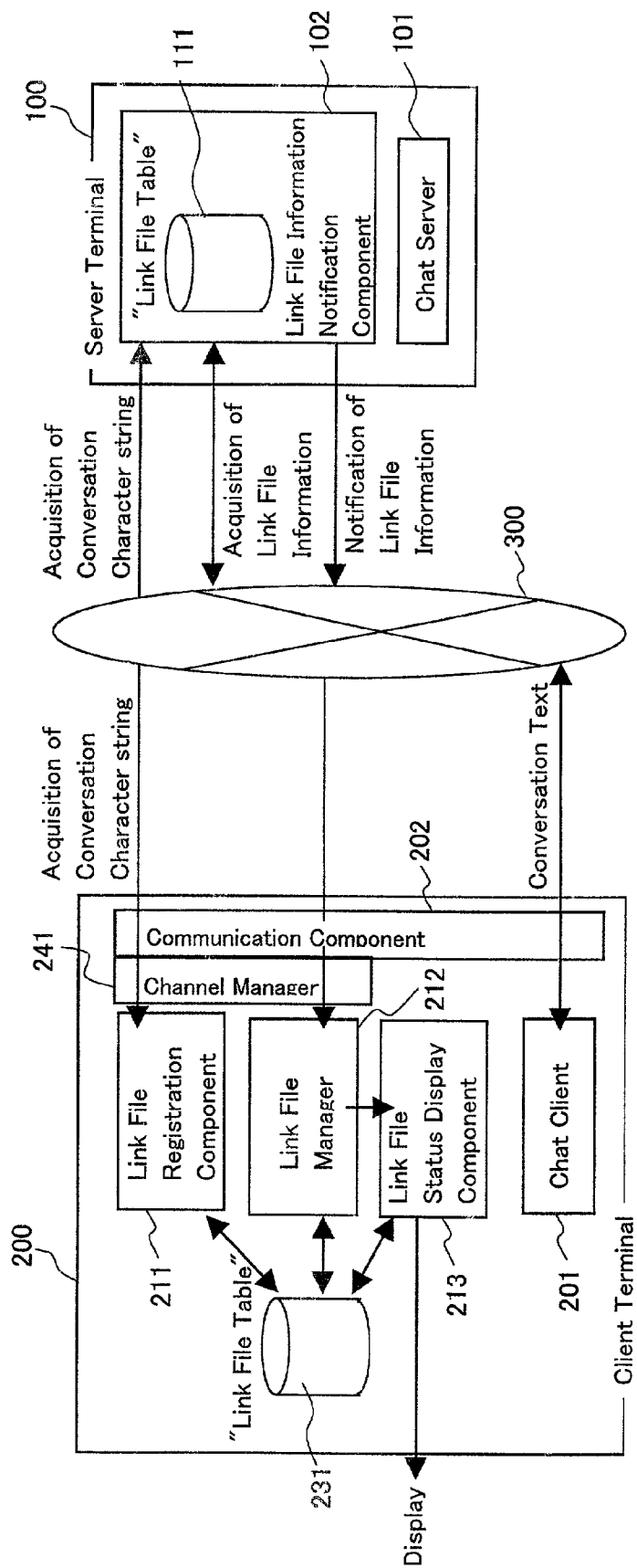
FIG. 14 is a control block diagram of the fifth embodiment.

FIG. 14 is a control block diagram for configuring the fifth embodiment.

The configuration shown in FIG. 14 is substantially the same as that used in the first embodiment, with the server terminal 100 and the client terminal 200 being connected to the network 300.

The client terminal 200 includes a chat client 201 that sends and receives text messages to and from other client terminals 200 through the network 300, a communication component 202 that sends and receives data to and from the network 300, and a channel manager 241 that manages the channel used by the user at the chat client 201. The chat client 201 receives character string input from the user and sends it through the communication component 202 as a text message within the channel, and receives text messages from the chat clients 201 of other client terminals 200. The chat content of the channel in which the user is currently participating is selected by the channel manager 241 and displayed on the client terminal 200.

The client terminal 200 also includes a link file registration component 211 that receives from a user a request for the registration of a link file and performs link file registration to its own terminal, and sends the registration information for this link file to the server terminal 100 side through the network 300, a link file manager 212 that acquires through the server terminal 100 information pertaining to the link files registered in the link file registration component 211 and manages the same, a link file status display component 213 that displays the information pertaining to the registered link files, and a link file table 231 that manages the registered link file information.

The link file registration component 211 extracts file names that can be registered as link files from character strings received by the chat client 201, and determines whether these are to be registered as link files. For example, if a web page address beginning with "http//" is included in a message in the channel, it is extracted as a file name that can be registered as a link file. Then, if the extracted file name is related to own terminal, it is determined that this file will be registered as a link file, and this file name is registered to the link file table 231. When information pertaining to a link file registered to the link file table 231 is received from the server terminal 100, the contents of the link file table 231 are updated using this information, and the status of the link file is displayed on a display device of the client terminal 200 by the link file status display component 213.

The server terminal 100 includes a chat server 101 that broadcasts to chat clients chat contents carried on within the various channels on the network 300, and a link file information notification component 102 that extracts file names that can be registered as link files from character strings sent out by the chat server 101, and registers these to the link file table 111 as link files.

The link file notification component 102 of the server terminal 100 extracts file names of files that can be registered as link files from the chat contents carried on in the various chat channels, and registers these to the link file table 111. Here again, just as with the client terminal 200, if a web page address beginning with "http//" is included in a message in the channel, for example, it can be extracted as a file name that can be registered as a link file, and registered to the link file table 111. The link file information notification component 102 acquires through the network 300 information pertaining to a link file registered to the link file table 111, stores this information in the link file table 111, and notifies the various client terminals 200.

It is also possible for the system to be configured such that the link file registration component 211 of the client terminal 200 receives a request for registration as a link file to a user's own terminal or to a channel, registers this to the link file table 231, and sends notification with this registration information to the server terminal 100. In this case, the link file table 231 of the client terminal 200 and the link file table 111 of the server terminal 100 are configured to manage the correspondence between the various client terminals and the various channels and the link file table, and to register and manage the link file names extracted from the character strings in the channel.

Operations of the Fifth Embodiment

Figure 22:
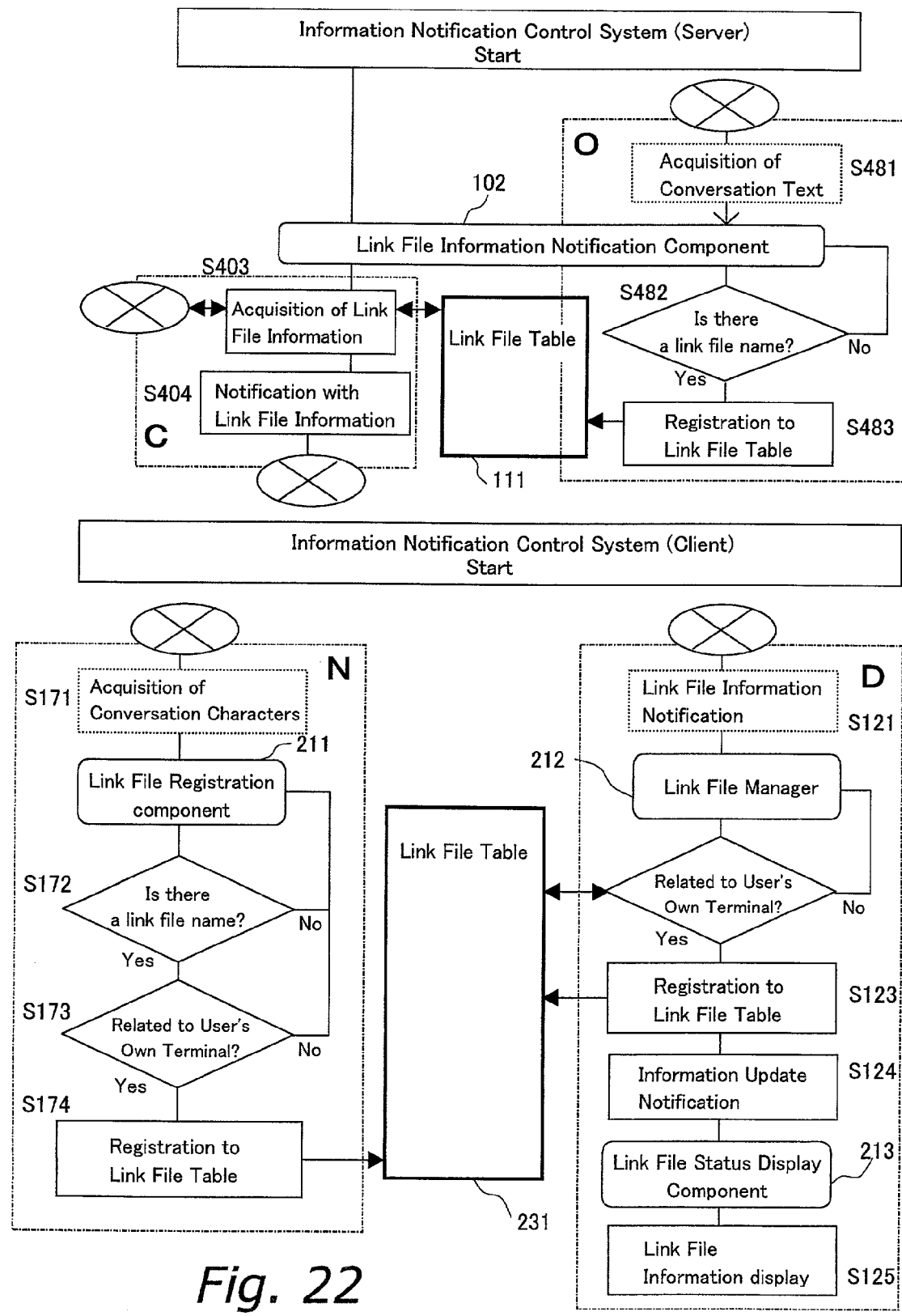
FIG. 22 is a control flow chart of the fifth embodiment.

FIG. 22 is a flow chart of the operation in this fifth embodiment.

The operations on the client terminal 200 side are labeled as processing N and D, and the operation on the server terminal 100 side is labeled as processing C and 0.

(N) At the client terminal 200, the chat text within the channel in which the user is participating is acquired by the chat client 201 (step S171). Here, the chat server 101 of the server terminal 100 receives messages from the various client terminals 200 sent out to each channel by the chat server 101 of the server terminal 100, and the chat contents of the channel in which a user is participating are selectively acquired by the channel manager 241.

When chat text has been acquired in a channel, the link file registration component 211 determines whether there is a file name that can be registered as a link file within the acquired chat text (step S172).

For example, if a file name having an identifier indicating a document file on a shared server or a web page address beginning with "http//" is included in a message in the channel, it is determined that this file can be registered as a link file, and it is determined whether this is related to own terminal (step S173). For instance, if it is determined that chat text including a file name that can be registered as a link file is a message to the user operating that terminal, then this file is determined to be related to that terminal.

If it is determined that a file included in the acquired chat text is related to that terminal, then the link file name is corresponded with the channel name and registered to the link file table 231.

Figure 32:
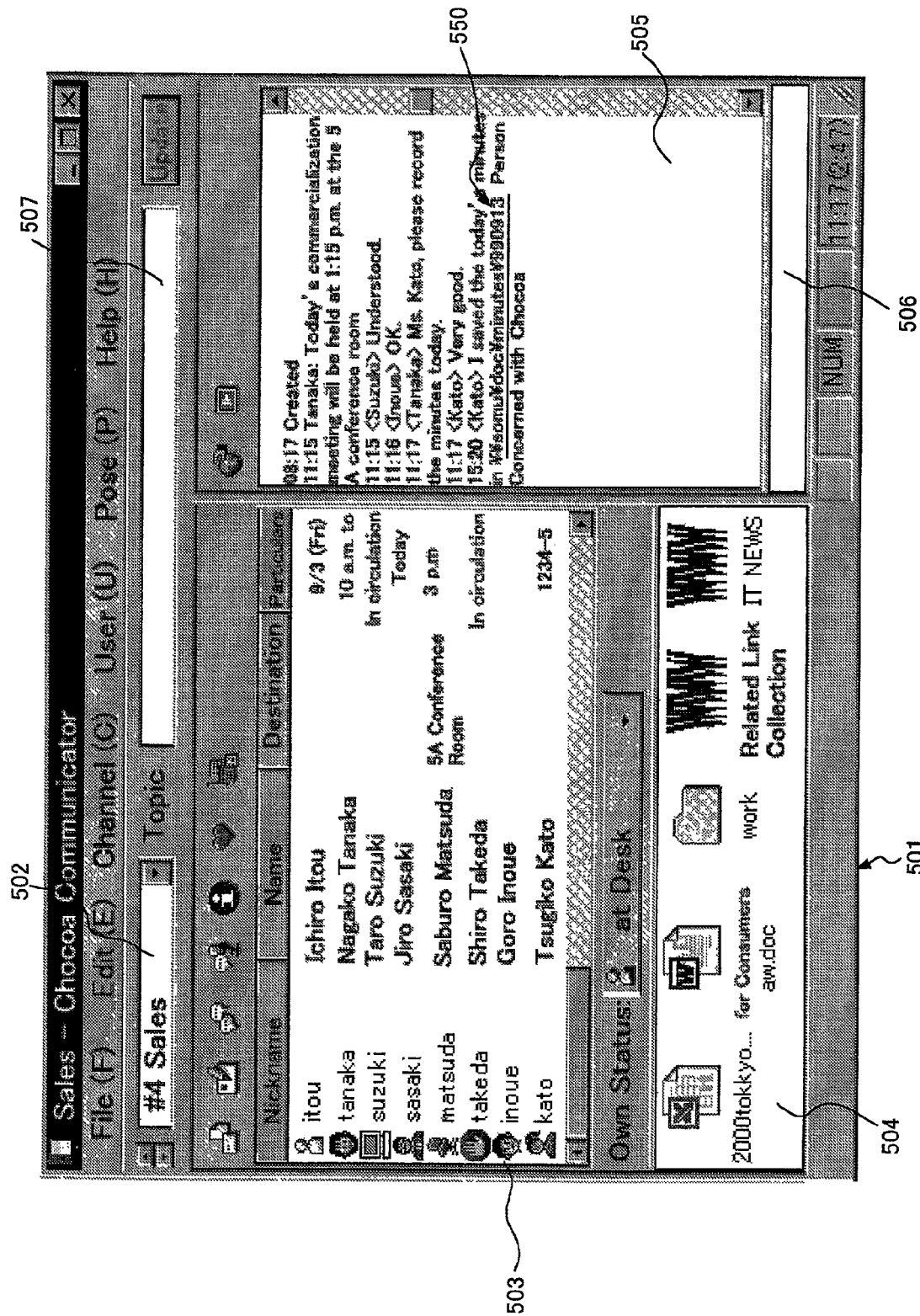
FIG. 32 is a diagram related to the screen display when link file registration is performed from chat text within a channel.

For example, as shown in FIG. 32, the chat content in the channel in which the user of a terminal is participating is displayed in the chat log display component 505 of the basic screen 501 of the chat client 201. If there is a file name that can be registered as a link file in the chat included in this chat log display component 505, and if the chat text is a message written to the user of that terminal, then the corresponding file name in the chat log display component 505 is made,into a hypertext display 550 and registered as a link file. It is also possible for files registered as link files to be displayed automatically in the link file display component 504, or for a user to copy from the hypertext display 550 to the link file display component 504.

(D) The client terminal 200 receives link file information notification sent from the server terminal 100, and the operations of updating the link file information and displaying the status are the same as in the first embodiment (FIG. 18D), and will therefore not be described in detail again.

(O) At the server terminal 100, the chat text in the various channels is acquired by the chat server 101 (step S481). Here, the chat text sent from the chat clients 201 of the various client terminals 200 is received, and the chat content of the various channel is acquired.

When the chat text in a channel is acquired, the link file information notification component 102 determines whether there is a file name that can be registered as a link file in the acquired chat text (step S482).

Just as with the link file registration component 211 of the client terminal 200, if a file name having an identifier indicating a document file on a shared server or a web page address beginning with "http//" is included in a message in the channel, it is determined that this file can be registered as a link file, and the link file name is related with the channel name and registered to the link file table 111 (step S483).

(C) At the server terminal 100, just as in the first embodiment (steps S403 and S404 in FIG. 18C), the link file information notification component 102 accesses the URL of the link file registered to the link file table 111 and acquires the e-mail address of the administrator, the telephone number of the administrator, the fax number of the administrator, the last update time, or other such basic information for that link file (step S403). The link file information notification component 102 sends and notifies the acquired information pertaining to the link file to the client terminal 200 side (step S404).

In the operations of steps S403 and S404 in FIG. 22C, it is possible for the configuration to be such that the link file information notification component 102 updates at specific intervals the information pertaining to the link files registered to the link file table 111 at a timing set by the system or a timing set by the user. For link files that have been changed, the update information thereof is sent from the link file information notification component 102 to the various client terminals 200 through the network 300.

Sixth Embodiment

Figure 7:
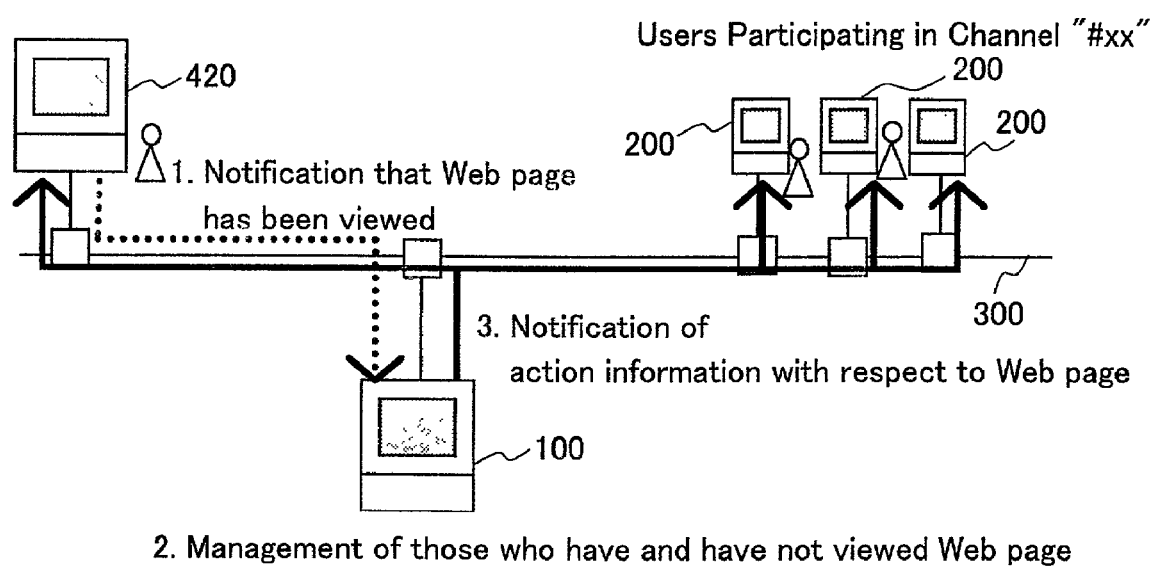
FIG. 7 is a schematic representation of the configuration of the sixth embodiment.

FIG. 7 is a schematic view of the configuration in the sixth embodiment.

Here, the server terminal 100, the client terminal 200, and a view notifier terminal 420 are connected to the network 300. The client terminal where a user who has viewed a document file or the like on a shared server or a web page registered to a channel performs notification to the effect that this file or the like has been viewed will be referred to herein as the view notifier terminal 420. This view notifier terminal 420 is configured the same as the other client terminals 200.

When the contents of a document file on a shared server or a web page registered to a channel are viewed with a browser or a suitable application, the view notifier terminal 420 notifies the server terminal 100 to the effect that this file or the like has been viewed.

The notification to the effect that a link file has been viewed is received by the server terminal 100 from the view notifier terminal 420, this is registered to a link file viewer list, and this viewer list is sent to the client terminals 200 participating in that channel.

Figure 15:
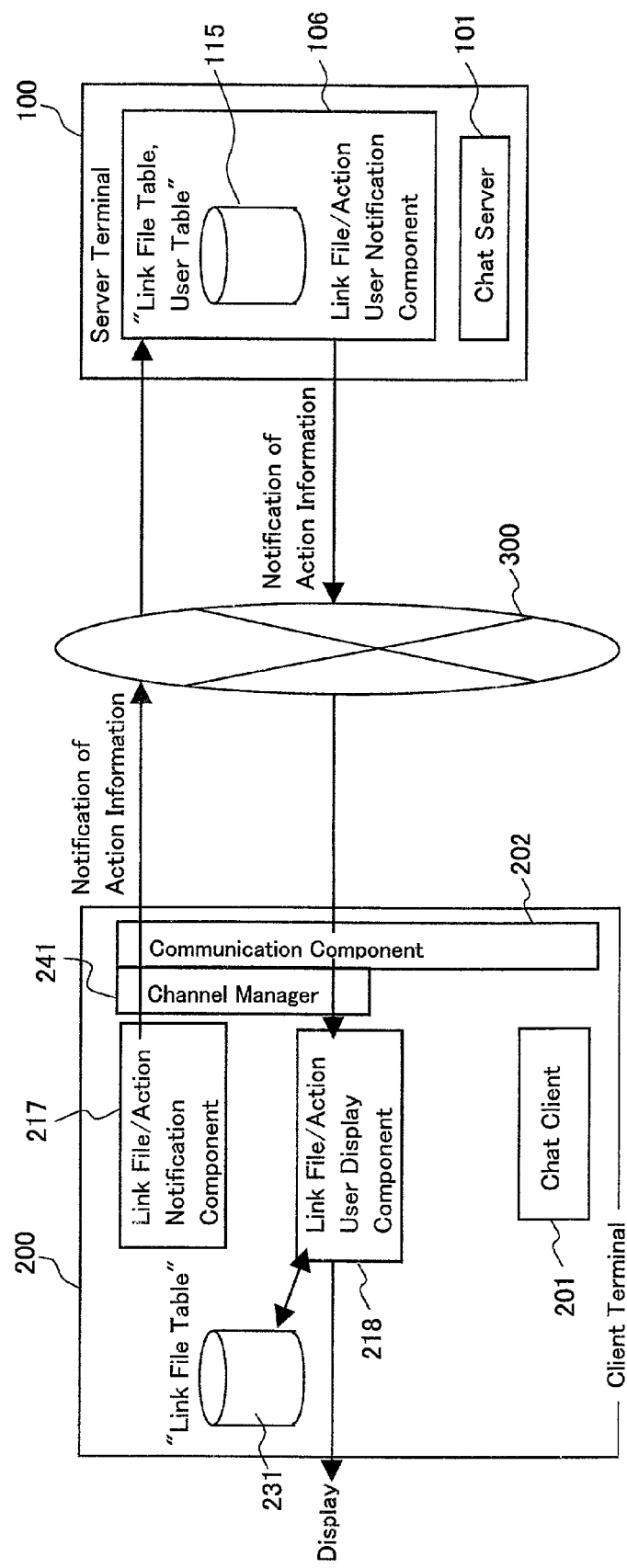
FIG. 15 is a control block diagram of the sixth embodiment.

FIG. 15 is a control block diagram for configuring this sixth embodiment.

With the configuration shown in FIG. 15, the server terminal 100 and the client terminals 200 are connected to the network 300, and the client terminals 200 all have the function of the view notifier terminal 420.

Each client terminal 200 includes a chat client 201 that sends and receives text messages to and from other client terminals 200 through the network 300, a communication component 202 that sends and receives data to and from the network 300, and a channel manager 241 that manages the channel used by the user at the chat client 201. The chat client 201 receives character string input from the user and sends it through the communication component 202 as a text message within the channel, and receives text messages from the chat clients 201 of other client terminals 200. The chat content of the channel in which the user is currently participating is selected by the channel manager 241 and displayed on the client terminal 200.

The client terminal 200 also includes a link file/action notification component 217 for sending the server terminal 100 a notification to the effect that a link file registered to the link file table 231 has been viewed, and a link file/action user display component 218 that receives information about the link file viewer list from the server terminal 100 and displays the viewer list on a display device of the client terminal 200 along with information about the link files registered to the link file table 231.

The server terminal 100 includes a chat server 101 that broadcasts to chat clients chat contents carried on within the various channels on the network 300, a link file/action user table 115 that indicates the correspondence between link files registered to the channel and the kind of action performed on the link files by users participating in that channel, and a link file/action user notification component 106 that upon receiving notification that a client terminal 200 has viewed the file or the like, updates the viewer list of the link file/action user table 115, and sends this viewer list to the various client terminals 200.

Operations of the Sixth Embodiment

Figure 23:
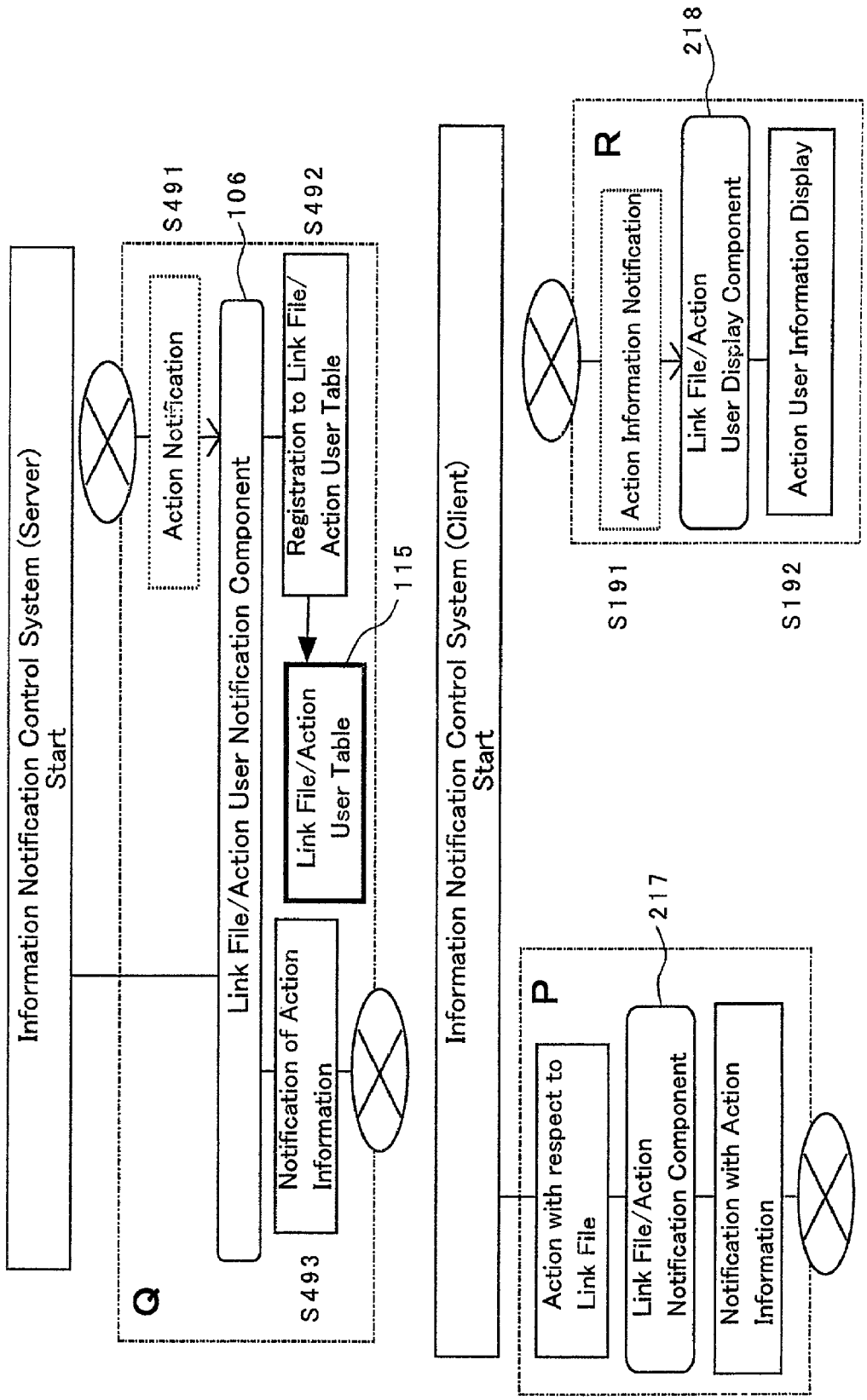
FIG. 23 is a control flow chart of the sixth embodiment.

FIG. 23 is a flow chart of the operation in this sixth embodiment.

The operations on the client terminal 200 side are labeled as processing P and R, and the operation on the server terminal 100 side is labeled as processing Q.

(P) At the client terminal 200, when an action is performed on a link file registered to a channel (step S181), the link file/action notification component 217 determines what action the user performed, and sends this action information to the server terminal 100.

Figure 33:
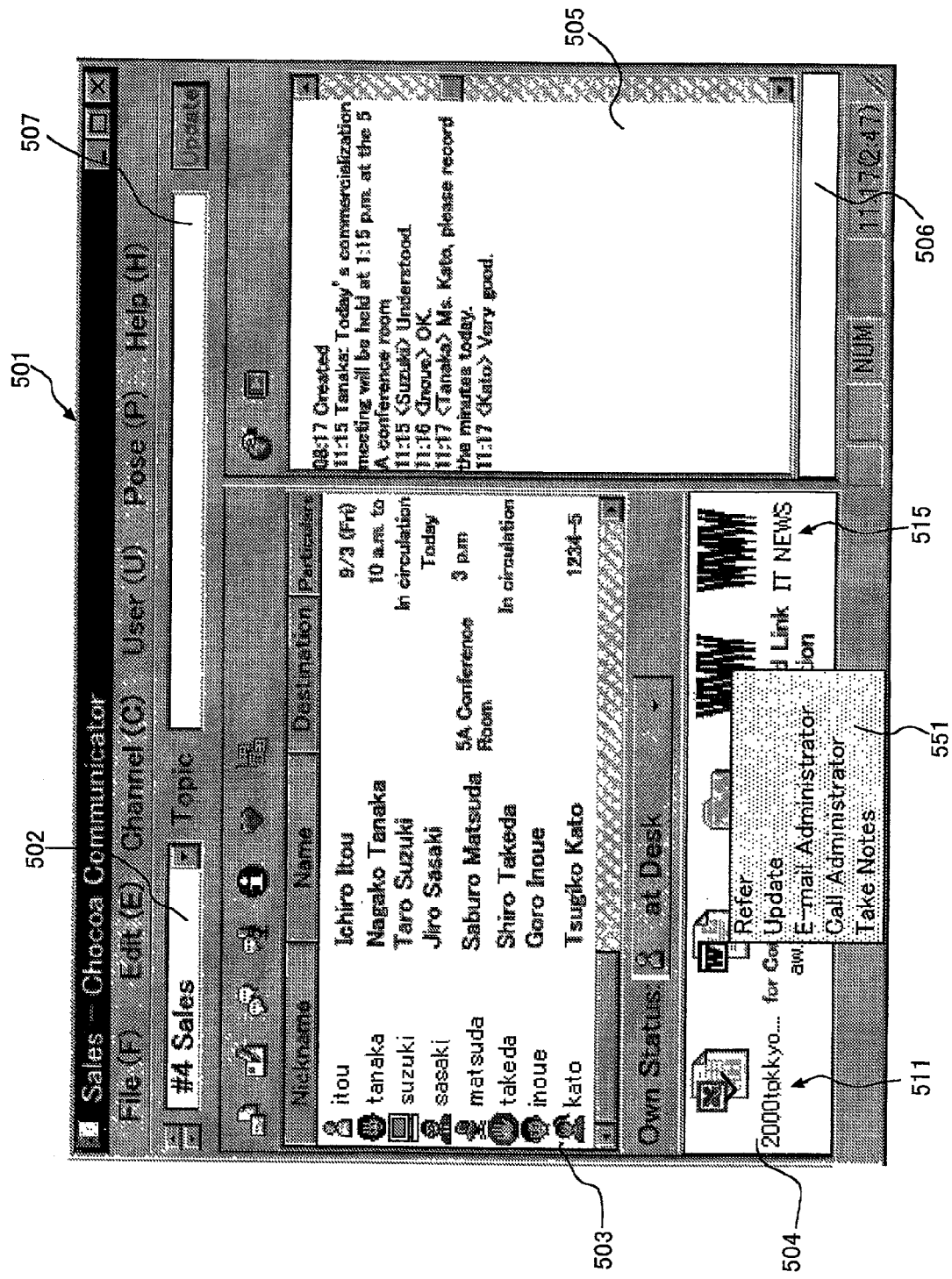
FIG. 33 is a diagram related to the screen display of an action dialog.

For example, as shown in FIG. 33, the link file display component 504 appears on the basic screen 501 of the chat client 201, document files in a shared server or web pages registered as link files are displayed as link file icons 511 to 515. An action dialog box 551 is displayed when the mouse pointer is positioned over the various link file icons 511 to 515. This action dialog box 551 includes action buttons such as "View," "Update," "Mail to administrator," "Telephone administrator," and "Attach memo." The user is able to select from among the various actions.

When a document file on a shared server or a web page registered as a link file is viewed using a browser or corresponding application, the user selects "View" from the action dialog box 551 to launch the browser or corresponding application, and is able to view the contents of the link file. If the user selects "Mail to administrator" from the action dialog box 551, the mailer is automatically launched, allowing e-mail input to be begun for the e-mail address of the link file administrator.

Thus, when the user performs an action on a link file, the link file/action notification component 217 determines what action was initiated by the user, and sends this action information to the server terminal.

(Q) When the server terminal 100 receives action information about a link file from a client terminal 200 (step S491), the link file/action user notification component 106 registers this action information to the link file/action user table 115 (step S492).

The link file/action user table 115 can be configured as shown in Table 5, for instance.

TABLE 5

| Link File Name | http://xxx.y.z/abc.html | | | | | ... |
|---|---|---|---|---|---|---|
| Action | View | Non-View | E-Mail | Tel | Update | ... |
| User Name | Oku | Tani | Tanaka | Saito | Oku | ... |
| | Tanaka | Ishida | Yamada | Kato | Tani | ... |
| | Sasaki | Kato | Saito | | Tanaka | ... |
| | Suzuki | Saito | | | Saito | ... |
| | Yamada | Hashida | | | Yamada | ... |
| | ... | ... | | | ... | ... |

This link file/action user table 115 consists of the categories of link file name, action, and user name, and is configured so that it stored the names of users who have performed actions, such as "View," "Non-view," "E-mail," "Tel.," or "Update," on link files registered to a channel.

The link file/action user notification component 106 of the server terminal 100 creates a viewer list using the action information in the link file/action user table 115, and notifies this viewer list as action information to the client terminals 200 (step S493).

(R) When a client terminal 200 receives notification of action information from the server terminal 100 pertaining to a registered link file (step S191), the link file/action user display component 218 corresponds this with the link files registered to the link file table 231, and action user information is displayed on a display device of the client terminal 200 (step S192).

Figure 34:
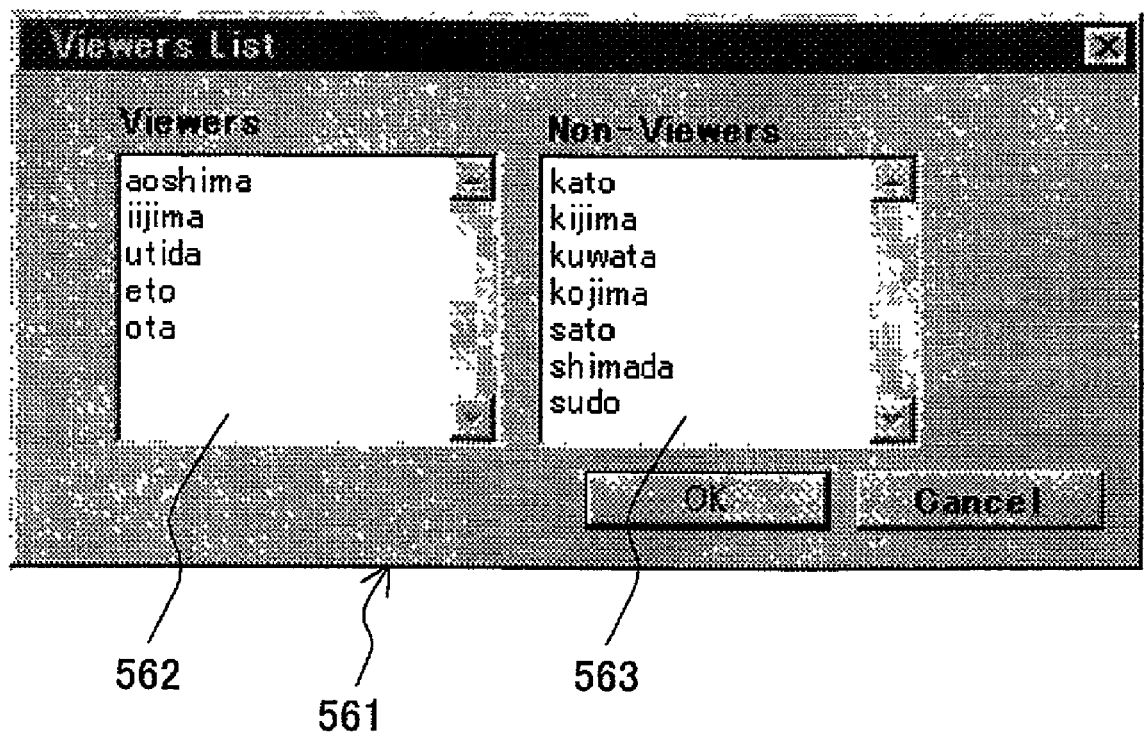
FIG. 34 is a diagram related to the screen display of a viewer list.

This display of action user information can be accomplished, for example, with a viewer list display such as that in FIG. 34. A viewer list screen 561 consists of a viewer display component 562 and a non-viewer display component 563, and it is easy to check who, out of all the channel participants, has and has not viewed this link file. A configuration such as this allows a link file registered to a channel to be circulated among the channel participants, eliminating instances where information is not properly shared.

The action user information displayed on a display device of the client terminal 200 can be used to create a list containing not only the categories of viewer and non-viewer, but also of people who have sent e-mail messages to the administrator, people who have telephoned the administrator, and other information taken from the link file/action user table 115, the display of which can be varied as desired.

Seventh Embodiment

Figure 8:
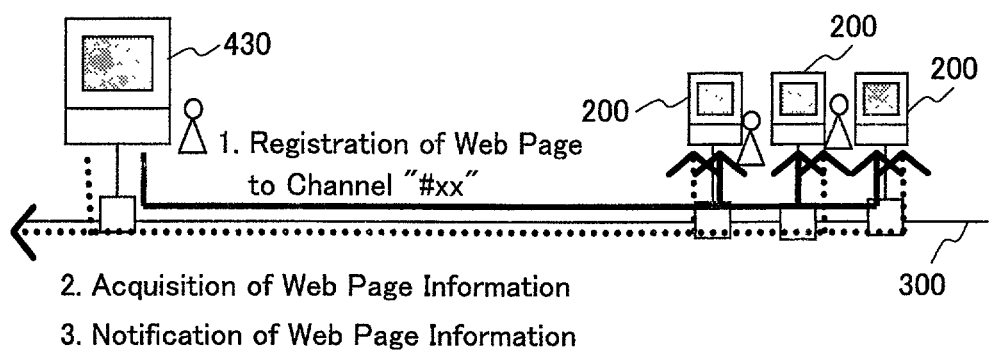
FIG. 8 is a schematic representation of the configuration of the seventh embodiment.

FIG. 8 is a schematic view of the configuration in the seventh embodiment.

Here, the client terminal 200 and a link file registrant terminal 430 are connected to the network 300. The client terminal where a user who registers a document file on a shared server, a web page or the like as related with a channel will be referred to herein as the link file registrant terminal 430. This link file registrant terminal 430 is configured the same as the other client terminals 200.

When a web page, a document file on a shared server or the like is registered to a channel as a link file, the link file registrant terminal 430 acquires information pertaining to this link file through the network 300, and notifies the channel of this information pertaining to the link file. In this case, information pertaining to the link file is sent to the other client terminals 200 without going through a server terminal where a chat server is installed.

Upon receiving notification of the registration of a link file, the client terminal 200 updates the link file table using this information, displays the notification contents, and makes any necessary changes to the operating menus and buttons of that link file.

Figure 16:
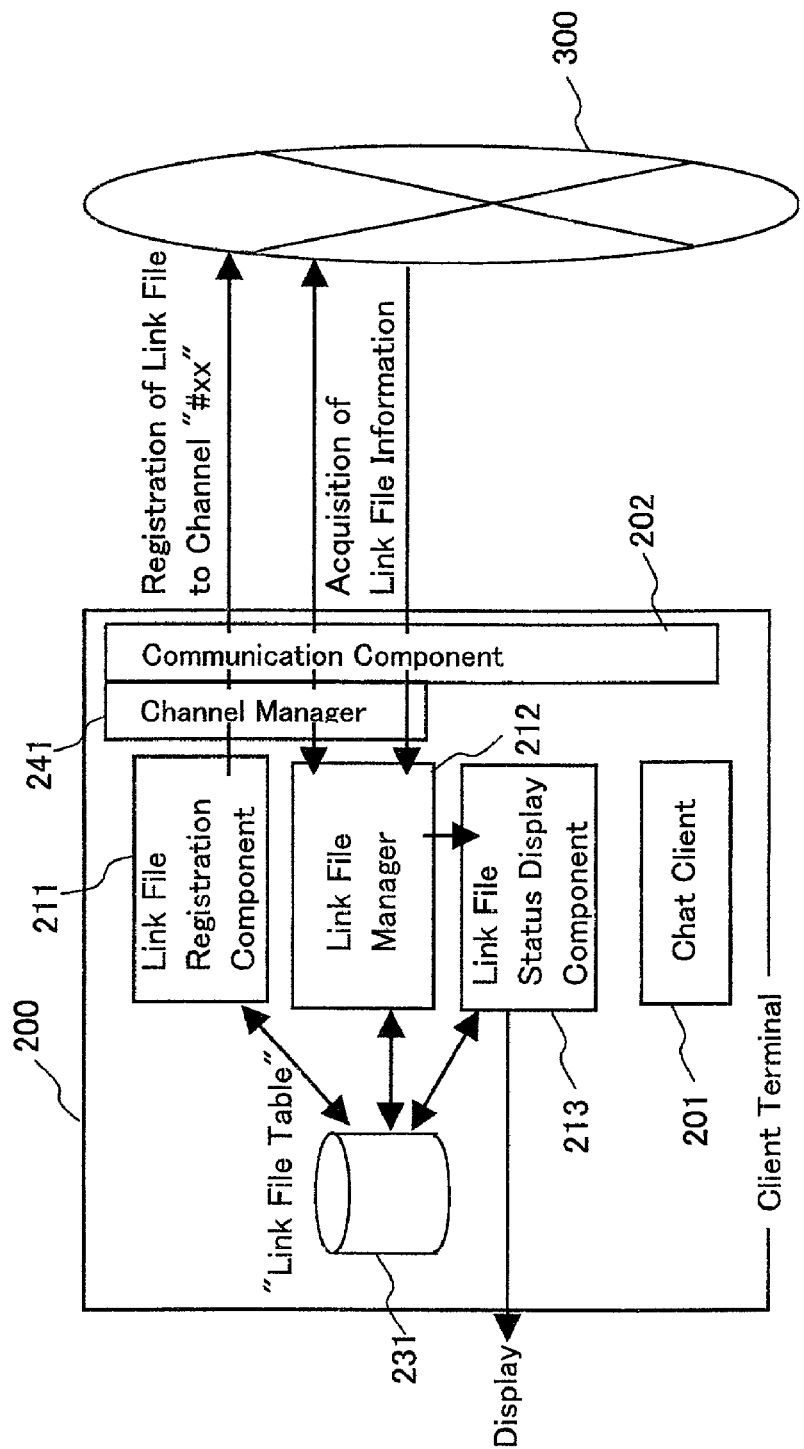
FIG. 16 is a control block diagram of the seventh embodiment.

FIG. 16 is a control block diagram of this seventh embodiment.

With the configuration shown in FIG. 16, the client terminals 200 are connected to the network 300, and the client terminals 200 all have the function of the link file registrant terminal 430.

Each client terminal 200 includes a chat client 201 that sends and receives text messages to and from other client terminals 200 through the network 300, a communication component 202 that sends and receives data to and from the network 300, and a channel manager 241 that manages the channel used by the user at the chat client 201. The chat client 201 receives character string input from the user and sends it through the communication component 202 as a text message within the channel, and receives text messages from the chat clients 201 of other client terminals 200. The chat content of the channel in which the user is currently participating is selected by the channel manager 241 and displayed on the client terminal 200.

The client terminal 200 also includes a link file registration component 211 that accepts from a user a request for the registration of a link file and performs link file registration, and sends the registration information for this link file to the server terminal 100 through the network 300, a link file manager 212 that acquires through the network 300 information pertaining to the link files registered in the link file registration component 211 and manages the same, and a link file status display component 213 that displays information pertaining to registered link files.

When a user registers a link file as related to a channel, the registration request is accepted by the link file registration component 211, and the name of this link file is stored in the link file table 231 and sent to the other client terminals 200 through the network 300.

When a user registers a link file as related to a channel, the link file manager 212 accesses the administrator of the link file through the network 300, acquires information pertaining to this link file, and registers this to the link file table 231. If there has been notification from another client terminal 200 about information pertaining to a link file, this link file information is registered to the link file table 231.

The link file status display component 213 acquires the name of a link file being registered and other such basic information or update information about the link file from the link file table 231 and the link file manager 212, and displays the same.

Operations of the Seventh Embodiment

Figure 24:
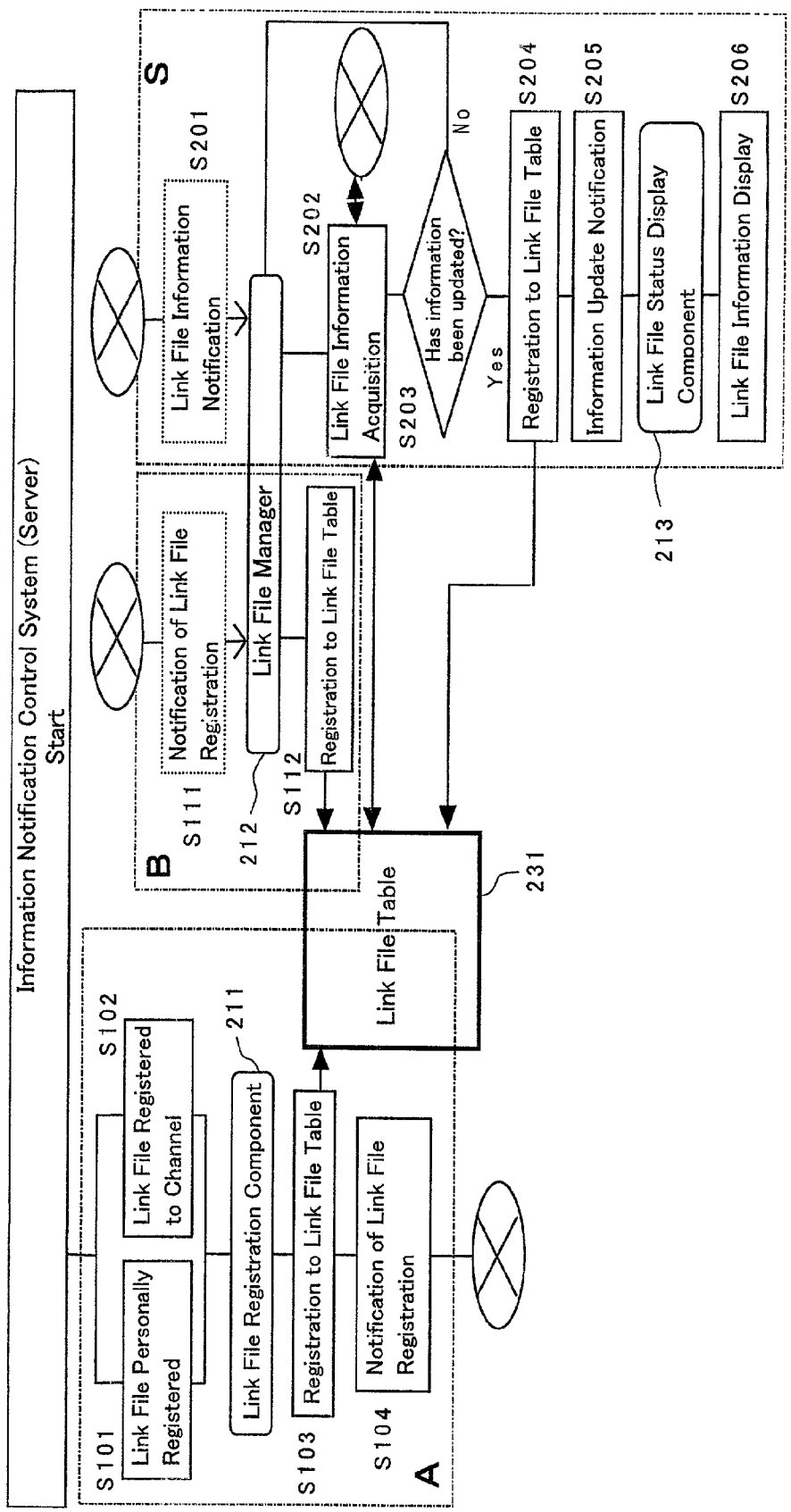
FIG. 24 is a control flow chart of the seventh embodiment.

FIG. 24 is a flow chart of the operations in this seventh embodiment.

The operations on the client terminal 200 side are labeled as processing A, B, and S.

(A) At the client terminal 200, when there has been a registration request where the user personally registers a link file (step S101), or if there has been a registration request where a link file is registered as related with a channel (step S102), the file name is registered to the link file table 231 by the link file registration component 211 (step S103). When a link file is registered to the link file table 231, link file registration information including that file name and the name of the registering user or registered channel name is sent and notified from the link file registration component 211 to the server terminal 100 (step S104).

(B) When there has been notification of the registration of a link file at a client terminal 200 (step S111), the link file manager 212 accepts this registration notification and registers the file name to the link file table 231 (step S112).

For example, when a link file has been registered at another client terminal 200, the notification of this registration is received through the server terminal 100. A link file registration notification such as this might be related to the registration of a link file with respect to a channel. Therefore, the channel name and the link file name would be corresponded and registered to the link file table 231.

(S) At the client terminal 200, when there has been a notification pertaining to link file information from another client terminal 200 (step S201), the link file manager 212 acquires link file information through the network 300 (step S202).

The link file manager 212 compares the link file information acquired through the network 300 to the link file information registered to the link file table 231, and determines if there has been an update (step S203). If the link file manager 212 determines that the link file information has been updated, the update contents are registered to the link file table 231 (step S204), an information update notification to the effect that the contents of the link file table 231 have been updated is produced according to the link file information notification, and this is displayed as a notification on the link file status display component 213 (step S205). The link file status display component 213 displays information pertaining to link files on a display device of the client terminal 200 (step S206).

The display of the notification that the link file information has been updated is the same as in the first embodiment, and will not be described in detail again.

The step of acquiring link file information (step S202) can be configured such that the link file manager 212 automatically acquires information pertaining to link files at specific intervals using a specific timing set by the system or a timing suitably set by the user.

Eighth Embodiment

Figure 9:
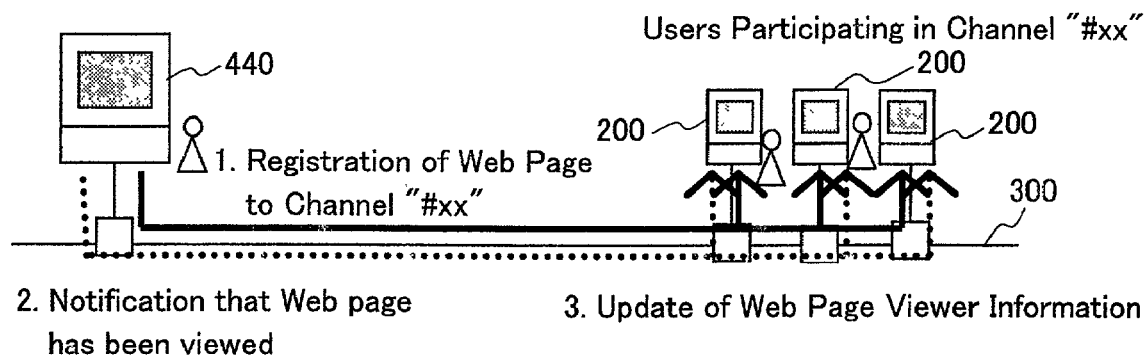
FIG. 9 is a schematic representation of the configuration of the eighth embodiment.

FIG. 9 is a schematic view of the configuration in the eighth embodiment.

The client terminal 200 and a view notifier terminal 440 are connected to the network 300. The client terminal where a user who has viewed a web page, a document file on a shared server or the like registered to a channel gives notification to the effect that a file or the like has been viewed will be referred to herein as the view notifier terminal 440. This view notifier terminal 440 is structured the same as the other client terminals 200.

When the contents of a document file on a shared server or a web page registered to a channel are viewed with a browser or a suitable application, the view notifier terminal 440 sends notification to the effect that a file or the like has been viewed to the other client terminals 200 through the network 300.

The client terminal 200, upon receiving from the view notifier terminal 440 notification to the effect that a link file has been viewed, registers the link file to a viewer list, and displays this viewer list on a display device of the client terminal 200.

Figure 17:
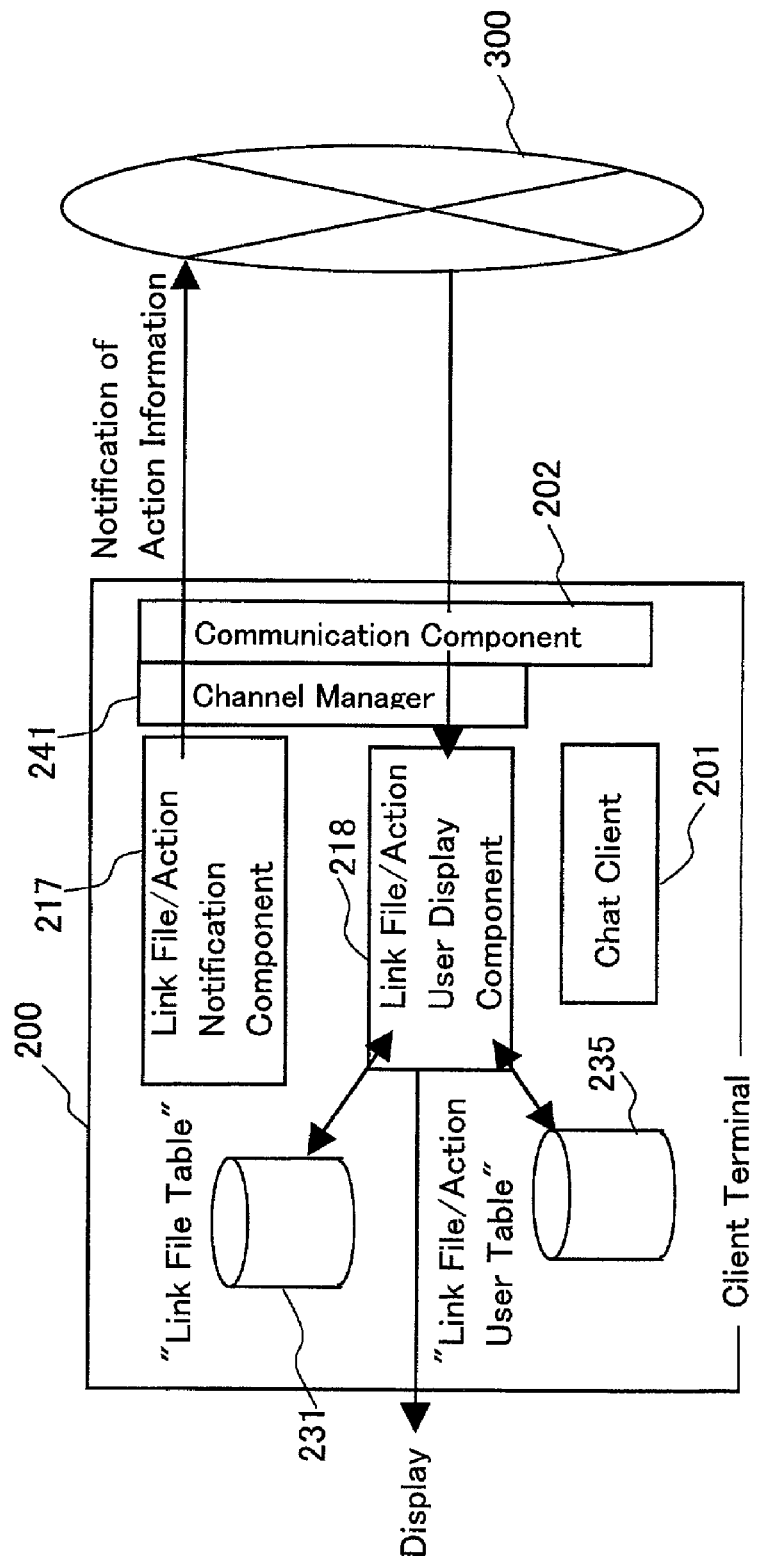
FIG. 17 is a control block diagram of the eighth embodiment.

FIG. 17 is a control block diagram of this eighth embodiment.

With the configuration shown in FIG. 17, the client terminal 200 is connected to the network 300, and the client terminals 200 all have the function of the view notifier terminal 440.

The client terminal 200 includes a chat client 201 that sends and receives text messages to and from other client terminals 200 through the network 300, a communication component 202 that sends and receives data to and from the network 300, and a channel manager 241 that manages the channel used by the user at the chat client 201. The chat client 201 receives character string input from the user and sends it through the communication component 202 as a text message within the channel, and receives text messages from the chat clients 201 of other client terminals 200. The chat content of the channel in which the user is currently participating is selected by the channel manager 241 and displayed on the client terminal 200.

The client terminal 200 also includes a link file/action notification component 217 for sending to the other client terminals 200 a notification to the effect that a link file registered to the link file table 231 has been viewed, a link file/action user display component 218 that receives information about the link file viewer list from the other client terminals 200 and displays the viewer list on a display device of the client terminal 200 along with information about the link files registered to the link file table 231, a link file table 231 that manages the link file information, and a link file/action user table 235 that manages the action information for the link file.

Operations of the Eighth Embodiment

Figure 25:
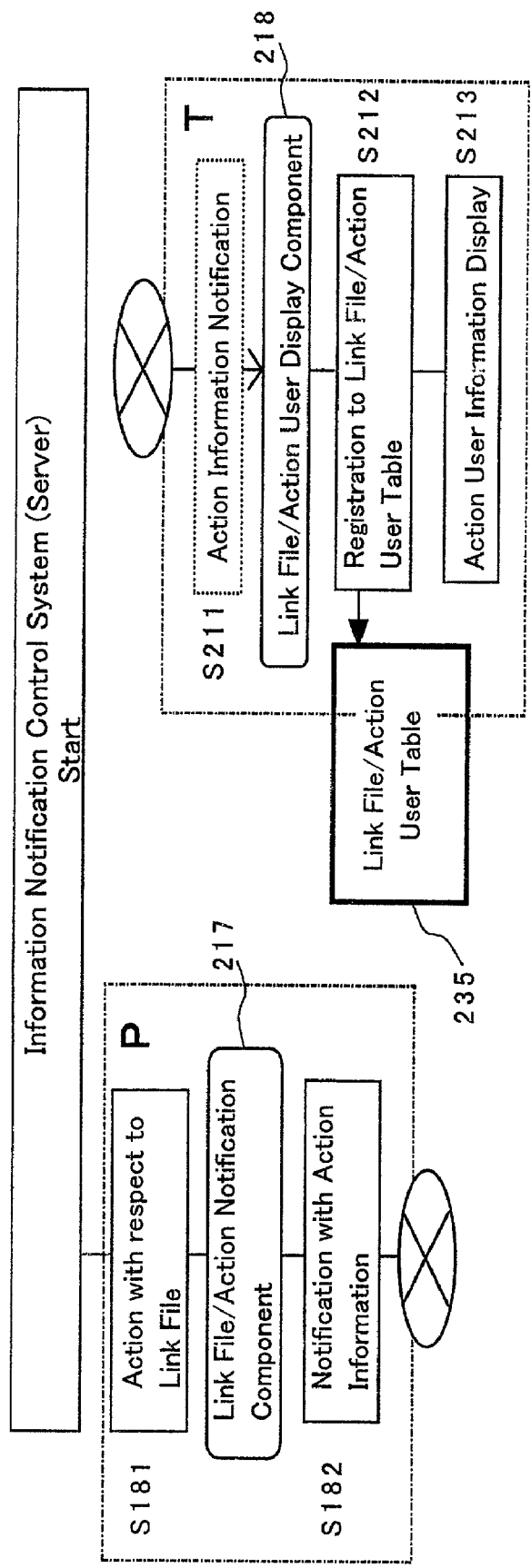
FIG. 25 is a control flow chart of the eighth embodiment.

FIG. 25 is a flow chart of the operation in this eighth embodiment.

The operations on the client terminal 200 side are labeled as P and T.

(P) At the client terminal 200, when an action is performed on a link file registered to a channel (step S181), the link file/action notification component 217 determines what action the user performed, and sends this action information to the server terminal 100 (step S182). This operation is the same as in the sixth embodiment (FIG. 23P), and will not be described in detail again.

(T) When notification about action information for a link file is received from another client terminal 200 (step S211), the link file/action user display component 218 registers this action information to the link file/action user table 235 (step S212).

The link file/action user table 115 can be configured as shown in the above-mentioned Table 5, for example.

The link file/action user display component 218 creates a viewer list using action information from the link file/action user table 235, and this viewer list is displayed on a display device of the client terminal 200 as action information (step S213).

The display of this action information is the same as the view list display shown in FIG. 34, for example, and will not be described in detail again.

This configuration allows a link file registered to a channel to be circulated among channel participants, eliminating incomplete information sharing.

Effect of the Invention

With the present invention, information pertaining to a highlighted file for which a registration request has been received from a user is acquired from a server, and basic information and update information can be checked without having to actually open the highlighted file.

Also, when the correspondence between each channel and the highlighted files related to each channel is managed by highlighted file table management means, update information about the highlighted files and update information about the channel can be to mutually reflect each other, making it possible to obtain update information in real time on the client side.

Furthermore, if it is possible to extract and register file names that can be registered as highlighted files from a chat character string inputted by a user within each channel, then highlighted files related to a user's own terminal can easily be registered as related to a channel, and information pertaining to the highlighted files can be easily acquired in real time.

Finally, if the system is designed so that the server is notified of action information pertaining to an action performed on the highlighted file by a user, then the highlighted file can be circulated using this action information, making it possible to eliminate incomplete information sharing among the various clients.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A shared information processing system, comprising:
   a client including
      highlighted file name extraction means for extracting file names that can be registered as highlighted files from a chat character string inputted by a user within a channel,
      highlighted file registration means for accepting from a user a request for registration of a highlighted file and performing registration of only a file name on a highlighted file list, and for notifying a server of registration information for said highlighted file,
      highlighted file management means for acquiring information pertaining to said highlighted file through said server and managing the same, and
      highlighted file status display means for displaying information pertaining to said highlighted file; and
   said server including
      highlighted file table management means for managing highlighted file names registered to said client using registration information about which notification has been given by the highlighted file registration means of said client, and
      highlighted file intonation notification means for acquiring information pertaining to a highlighted file managed by the highlighted file table management means, and giving notification thereof to the client where the highlighted file is registered,
   wherein highlighted file names indicate locations where the files are stored, and
   wherein a plurality of users can communicate simultaneously by sharing channels set up on a network by a server and clients interconnected over said network, and notify other clients of a chat character string inputted by a user through a client.

2. The shared information processing system according to claim 1, wherein said highlighted file information notification means acquires basic information, such as where said highlighted file is stored, and notifies said client thereof.

3. The shared information processing system according to claim 1, wherein said highlighted file information notification means acquires update information such as when and by whom said highlighted file was updated, and notifies said client thereof.

4. The shared information processing system according to claim 1, wherein said server further includes user information management means for acquiring user information about a user that has registered and highlighted said file at said client, and notifies the administrator of said highlighted file of statistical information based on said user information.

5. A shared information processing system, comprising:
   a server including
      highlighted file table management means for managing highlighted file names registered to said each client using registration information about which notification has been given by the highlighted file registration means of said client and for managing correspondence between a virtual chat room (hereinafter "channel") and a highlighted file related to that channel, and
      update information notification means for acquiring update information for said channel and updating information pertaining to a corresponding highlighted file, acquiring update information for said highlighted file and updating information pertaining to the corresponding channel, and notifying each client of the update information; and
   said client including
      highlighted file name extraction means for extracting file names that can be registered as highlighted files from a chat character string inputted by a user within a channel,
      highlighted tile management means for acquiring information pertaining to a highlighted file related to said channel through the server and managing the same, and
      highlighted file status display means for displaying information pertaining to said highlighted file,
   wherein highlighted file names indicate locations where the files are stored, and
   wherein a plurality of users can communicate simultaneously by sharing channels set up on a network by a server and clients interconnected over said network, and notify other clients of a chat character string inputted by a user through a client.

6. The shared information processing system according to claim 5, the server further including
   accessory part management means for managing the correspondence between accessory parts of a highlighted file related to a channel and accessory parts within said channel, and
   accessory part update information management means for acquiring update information for accessory parts within said channel and updating information for accessory parts within said channel and updating information pertaining to accessory parts of the corresponding highlighted file, and acquiring update information for accessory parts within said highlighted file and updating information pertaining to accessory parts within the corresponding channel, and notifying said each client of said update information.

7. A shared information processing system, comprising:
a client including
highlighted file name extraction means for extracting file names that can be registered as highlighted files from a chat character string inputted by a user within a channel,
highlighted file registration determination means for determining whether or not a file corresponding to an extracted file name is to be registered as a highlighted file,
highlighted file registration means for registering a highlighted file as related to a corresponding virtual chat room (hereinafter "channel") when the highlighted file registration determination means determines that a highlighted file is to be registered, and notifying a server of registration information for said highlighted file,
highlighted file management means for acquiring information pertaining to said highlighted file through said server and managing the same and
highlighted file status display means for displaying information pertaining to said highlighted file; and
said server including
highlighted file table management means for managing highlighted file names registered to said client using registration information about which notification has been given by the highlighted file registration means of said client, and
highlighted file information notification means for acquiring information pertaining to a highlighted file managed by said highlighted file table management means, and giving notification thereof to the channel or the client where said highlighted file is registered,
wherein a plurality of users can communicate simultaneously by sharing channels set up on a network by a server and clients interconnected over said network, and notify other clients of a chat character string inputted by a user through a client.

8. A shared information processing system, comprising:
a client including
highlighted file name extraction means for extracting file names that can be registered as highlighted files from a chat character string inputted by a user within a channel,
highlighted file information management means for managing information pertaining to a highlighted file related to a virtual chat room (hereinafter "channel"),
highlighted file action notification means for notifying a server of action information pertaining to an action performed on said highlighted file by a user, and
highlighted file action user display means for receiving from said server action information about a highlighted file registered as related with said channel, and displaying a list of action information; and
said server including
highlighted file action user notification means for notifying the other clients or channels of an action on a highlighted file about which notification has been given by said client,
wherein highlighted file names indicate locations where the files are stored, and
wherein a plurality of users can communicate simultaneously by sharing channels set up on a network by a server and clients interconnected over said network, and notify other clients of a chat character string inputted by a user through a client.

9. A shared information processing system, comprising:
a client including
highlighted file name extraction means for extracting file names that can be registered as highlighted files from a chat character string inputted by a user within a channel,
highlighted file registration means for receiving from a user a request for registration of a highlighted file and registering said highlighted file, and also notifying the other clients of the registration information for said highlighted file through said network,
highlighted file management means for acquiring through the network information pertaining to said highlighted file using registration information about which notification has been given by the highlighted file registration means of the other clients and managing the same, and
highlighted file status display means for displaying information pertaining to said highlighted file,
wherein highlighted file names indicate locations where the files are stored, and
wherein a plurality of users can communicate simultaneously by sharing virtual chat rooms (hereinafter "channels") set up on a network by a server and clients interconnected over said network, and notify other clients of a chat character string inputted by a user through a client.

10. A shared information processing system, comprising:
a client including
highlighted file name extraction means for extracting file names that can be registered as highlighted files from a chat character string inputted by a user within a channel,
highlighted file information management means for managing information pertaining to a highlighted file related to a virtual chat room (hereinafter "channel"),
highlighted file action notification means for notifying the other clients of action information pertaining to an action performed on said highlighted file by a user, and
highlighted file action user display means for receiving action information about a highlighted file about which notification has been given by another client, and displaying a list of action information about registered highlighted files,
wherein highlighted file names indicate locations where the files are stored,
wherein a plurality of users can communicate simultaneously by sharing channels set up on a network by a server and clients interconnected over said network, and notify other clients of a chat character string inputted by a user through a client.

11. A computer readable recording medium storing a shared information processing program for causing a computer to execute:
extracting file names that can be registered as highlighted files from a chat character string inputted by a user within a channel,
receiving from a user a request for registration of a highlighted file and performing registration on a highlighted file list, and also notifying said server of registration information for said highlighted file;
acquiring information pertaining to said highlighted file through a server and managing the same; and displaying information pertaining to said highlighted file,
wherein highlighted file names indicate locations where the files are stored, and
wherein a plurality of users can communicate simultaneously by sharing virtual chat rooms (hereinafter "channels") set up on a network by a server and clients interconnected over said network, and notify other clients of a chat character string inputted by a user through a client.

12. A computer readable recording medium storing a shared information processing program for causing a computer to execute:
   extracting file names that can be registered as highlighted files from a chat character string inputted by a user within a channel,
   managing highlighted file names registered by a client using registration information about which notification has been given by said client; and
   acquiring information pertaining to a managed highlighted file, and giving notification thereof to the client where the highlighted file is registered,
   wherein highlighted file names indicate locations where the files are stored, and
   wherein a plurality of users can communicate simultaneously by sharing virtual chat rooms (hereinafter "channels") set up on a network by a server and clients interconnected over said network, and notify other clients of a chat character string inputted by a user through a client.

13. A computer-implemented method for effecting the function of a server used in a shared information processing system wherein a plurality of users can communicate simultaneously by the sharing one of virtual chat rooms (hereinafter "channel") set up on a network by a server and clients interconnected over said network, and the notifying of other clients of a chat character string inputted by a user through one said client, said method comprising:
   extracting file names that can be registered as highlighted files from a chat character string inputted by a user within a channel,
   managing highlighted file names for said each channel using registration information about which notification from said client has been given; and
   acquiring information pertaining to a highlighted file managed by said highlighted file table management means, and giving notification thereof to the client who is connected to a channel where the highlighted file is registered,
   wherein highlighted file names indicate locations where the files are stored.

14. A computer-implemented method for effecting the function of a client used in a shared information processing system wherein a plurality of users can communicate simultaneously by the sharing one of virtual chat rooms (hereinafter "channel") set up on a network by a server and clients interconnected over said network, and the notifying of other clients of a chat character string inputted by a user through one said client, said method comprising:
   extracting file names that can be registered as highlighted files from a chat character string inputted by a user within a channel,
   receiving from a user a request for registration of a highlighted file and performing registration on a highlighted file list, and also notifying said server of registration information for said highlighted file;
   acquiring information pertaining to said highlighted file through said server and managing the same; and
   displaying information pertaining to said highlighted file,
   wherein highlighted file names indicate locations where the files are stored.

* * * * *

UNITED STATES PATENT AND TRADEMARK OFFICE
CERTIFICATE OF CORRECTION

PATENT NO. : 7,194,505 B2  Page 1 of 1
APPLICATION NO. : 09/938550
DATED : March 20, 2007
INVENTOR(S) : Ai Yano et al.

It is certified that error appears in the above-identified patent and that said Letters Patent is hereby corrected as shown below:

Column 31, Line 61, change "intonation" to --information--.

Column 32, Line 12, after "information" insert --,--.

Column 32, Line 43, after "highlighted" change "tile" to --file--.

Signed and Sealed this

Fifteenth Day of April, 2008

JON W. DUDAS
*Director of the United States Patent and Trademark Office*